US012729971B2

(12) United States Patent
Eisinga et al.

(10) Patent No.: US 12,729,971 B2
(45) Date of Patent: Sep. 8, 2026

(54) METHODS AND SYSTEMS FOR DETERMINING ESTIMATED TRAVEL TIMES THROUGH A NAVIGABLE NETWORK

(71) Applicant: TomTom Navigation B.V., Amsterdam (NL)

(72) Inventors: Kia Eisinga, Utrecht (NL); Jose Francisco Santiago Nuñez, Amsterdam (NL); Caifu Hong, Berlin (DE); Andreas Menge, Berlin (DE)

(73) Assignee: TOMTOM NAVIGATION B.V., Amsterdam (NL)

(*) Notice: Subject to any disclaimer, the term of this patent is extended or adjusted under 35 U.S.C. 154(b) by 61 days.

(21) Appl. No.: 18/370,316

(22) PCT Filed: Apr. 25, 2022

(86) PCT No.: PCT/EP2022/060813
§ 371 (c)(1),
(2) Date: Sep. 19, 2023

(87) PCT Pub. No.: WO2022/229049
PCT Pub. Date: Nov. 3, 2022

(65) Prior Publication Data

US 2024/0328803 A1 Oct. 3, 2024

(30) Foreign Application Priority Data

Apr. 28, 2021 (GB) ..................................... 2106070

(51) Int. Cl.
*G01C 21/34* (2006.01)
*G08G 1/01* (2006.01)

(52) U.S. Cl.
CPC ....... *G01C 21/3492* (2013.01); *G08G 1/0112* (2013.01); *G08G 1/0129* (2013.01)

(58) Field of Classification Search
CPC . G01C 21/3492; G08G 1/0112; G08G 1/0129
See application file for complete search history.

(56) References Cited

U.S. PATENT DOCUMENTS 10,127,809 B2 * 11/2018 Macfarlane .......... G08G 1/0129
2007/0271034 A1 11/2007 Perry
(Continued)

FOREIGN PATENT DOCUMENTS

CN 1550756 A 12/2004
CN 109791731 A 5/2019
(Continued)

OTHER PUBLICATIONS

International Search Report and Written Opinion for application PCT/EP2022/060813 dated Sep. 2, 2022.
(Continued)

*Primary Examiner* — Scott A Browne
*Assistant Examiner* — Josephine Elizabeth Rich
(74) *Attorney, Agent, or Firm* — Buckley, Maschoff & Talwalkar LLC

(57) ABSTRACT

A method for generating a model that can be used by a routing module to determine estimated travel times for routes within a navigable network. The model is generated by a process of machine learning with training data that is obtained from historic positional data recorded by devices travelling within the navigable network. The model can be updated over time as new positional data is obtained. The newly obtained positional data is also used for evaluating the performance of the model and for detecting so-called 'pattern-breaking' events where the underlying conditions in the navigable network suddenly change such that the previous version of the model may no longer give accurate estimated travel times.

18 Claims, 10 Drawing Sheets

(56) References Cited

U.S. PATENT DOCUMENTS

2011/0301841 A1 12/2011 Schuurbiers et al.
2015/0228188 A1 8/2015 Macfarlane et al.
2019/0018426 A1* 1/2019 Yao ...................... G05D 1/0212
2019/0204102 A1* 7/2019 Wang ................. G01C 21/3697
2020/0012963 A1* 1/2020 Johnston ................ G06N 20/20

FOREIGN PATENT DOCUMENTS

GB 2572717 A 10/2019
WO 202001261 A1 1/2020

OTHER PUBLICATIONS

Chinese First Office Action, China National Intellectual Property Administration ("CNIPA"), dated May 28, 2026, for PRC (China) Pat. Appln. No. 202280025403.4, 12 pages.

* cited by examiner

METHODS AND SYSTEMS FOR DETERMINING ESTIMATED TRAVEL TIMES THROUGH A NAVIGABLE NETWORK

RELATED APPLICATIONS

The instant application is a national phase application of, and hereby claims priority to, pending PCT application number PCT/EP2022/060813, which was filed on 25 Apr. 2022, which published as WO2022/229049 on 3 Nov. 2022. The instant application also claims priority to GB application number 2106070.2, which was filed on 28 Apr. 2021, and to which PCT/EP2022/060813 claims priority. Both of these applications are incorporated by reference herein.

FIELD OF THE INVENTION

The present invention generally relates to navigation systems, e.g. of the type that include or have access to a routing module that is operable to plan a route through a navigable network in an area covered by an electronic map. In particular, the present invention relates to methods for generating and updating models that can be used by a routing module of a navigation system in determining an estimated travel time for a given route through a navigable network to provide improved travel time estimates.

BACKGROUND TO THE INVENTION

Navigation devices that include GPS (Global Positioning System) signal reception and processing functionality are well known, and are widely employed as in-car, or other vehicle, navigation systems. In general terms, a modern navigation device comprises a processor, memory (at least one of volatile and non-volatile, and commonly both), and map data stored within said memory. The processor and memory co-operate to provide an execution environment in which a software operating system may be established, and additionally it is commonplace for one or more additional software programs to be provided to enable the functionality of the navigation device to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could, e.g., be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Navigation devices of this type may typically be realised in the form of a portable navigation device (PND) that can be mounted on the dashboard or windscreen of a vehicle, but in general, and increasingly, navigation devices may also be realised as part of an on-board computer of the vehicle radio, or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation guidance along a calculated route.

Navigation devices also typically have access to an electronic map representation of a navigable network on which the vehicle is travelling, and the route calculation and navigation guidance is normally performed with reference to this electronic map, in a manner that is generally known in the art. The electronic map is typically maintained at a remote map server, and is regularly updated by the map service provider. The map is then provided from the map server to the navigation device, e.g., through a suitable map client interface. At least a portion of the electronic map may be stored, at least temporarily, locally to the navigation device, with the locally stored map data being periodically updated, but the electronic map may also, or alternatively, be streamed to the navigation device, e.g. depending on the memory/bandwidth resource of the navigation device.

The utility of such navigation devices is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

A routing module of, or accessible by (e.g. in the case of an online routing module), the navigation device thus executes and implements a route planning algorithm that is operable to explore the navigable network (or, more precisely, the electronic map representation thereof) to search for a "best" or "optimum" route between the start and destination locations using the electronic map data. This is normally done by exploring multiple possible routes through the navigable network and determining an associated "cost" for each route, with the route (or routes) having the lowest associated cost(s) thereby being selected as the "best" or "optimum" route, e.g. for output. Which route is determined to be the "best" or "optimum" route is typically assessed according to a set of predetermined criteria, which can be defined in terms of one or more routing parameters.

The determination of the "best" or "optimum" route is typically made using a suitable cost function, with a cost value for a route normally being calculated as the sum of individual costs for the navigable elements along the route. The cost function can take into account multiple routing parameters, with appropriate weightings.

For example, the "best" or "optimum" route may be determined as the fastest route to the destination, in which case the routing parameter used when defining the cost may be a travel time (with the "best" or "optimum" route being the route with the shortest travel time, i.e. lowest travel time cost). However, it will be appreciated that the "best" or "optimum" route need not necessarily be the fastest route, and the cost function may be adapted to give different weightings to any other routing criteria of interest (e.g. travel distance, number of turns along the route, avoiding major roads and other such user preferences, scenicity, etc.), as desired.

The cost function thus describes how different routing parameters are weighted, or combined, when determining a cost for the route. The actual values for the different routing parameters that are input to the cost function when determining a cost are generally determined using the map data. For example, a travel time cost for a segment may be determined based on the length of the segment and the expected travel speed for that segment, which information is typically stored in the electronic map. The travel time cost for a particular segment representing part of a navigable element may be stored directly in the map data, or may be stored indirectly, e.g. by storing data indicative of the length of the segment and data indicative of an expected travel speed along the segment, from which the travel time can then be calculated. Various possibilities are available in this regard.

In addition to this map data, the routing module of the navigation system normally receives, in use, traffic information indicative of the (current) traffic conditions in the network, which information is also input to the route planning algorithm, and which can be used thereby when determining the cost values. For instance, the traffic information may be used to adjust the expected travel speed for a segment. Thus, if a particular segment is determined to currently be heavily congested, such that there is expected to be reduced travel speed along that segment, the segment would then be assigned a higher travel time cost. The routing algorithm is thereby able to plan routes with shorter travel times taking into account both the road information and also the current traffic conditions, e.g. by avoiding heavily congested segments, even where these segments may be quicker to traverse in other traffic conditions.

Traffic is a highly dynamic phenomenon that depends on the road infrastructure, as well as the time of the day (e.g. rush hour), but also on local, temporary incidents such as traffic accidents, or roadworks. Real-time traffic monitoring systems, based on various technologies (e.g. mobile phone data exchanges, fixed cameras, GPS fleet tracking) are known that are used to identify traffic delays and to feed the information into notification systems, which information can then be passed to the navigation device, typically via a traffic information server. The navigation device may thus continually monitor road and traffic conditions and use this information during the route planning. The traffic information used by the routing module may also include historic or predicted traffic information.

It will be appreciated that the searching for, and cost determination for, a route along which to guide the driver can therefore be very sophisticated, and the route planning functionality of a navigation device may take into account a combination of live, historical, existing and/or predicted traffic and road information. Once a route has been calculated, depending on the type of navigation device, the user may then interact with the navigation device to select the desired calculated route, potentially from a list of proposed routes. Optionally, the user may intervene in, or guide, the route selection process, for example by specifying that certain routes, roads, locations or criteria are to be avoided or are mandatory for a particular journey.

The route calculation aspect forms one primary function of a navigation device. Providing navigation guidance along such a route is another primary function of navigation devices. During navigation along a calculated route, it is usual for such navigation devices to generate a set of navigation instructions to guide the user (or vehicle) along a chosen route to the end of that route, i.e. the desired destination. For instance, in the context of a PND, it is usual for the PND to display such navigation instructions on-screen during the navigation, along with a display of the electronic map, such information regularly being updated on-screen so that the map information displayed is representative of the current location of the device, and thus of the user or user's vehicle if the device is being used for in-vehicle navigation.

Navigation instructions for guiding a user along a predetermined route can thus be provided using such an electronic map by matching the (current) position of a device to the map, and then providing relevant navigation instructions as the device approaches various intersections, or other decision points, within the navigable network. For example, the navigation guidance may comprise an instruction that is generated for display to a user, such as an instruction to "Turn left at the next junction". Although the discussion above mainly focusses on generating navigation instructions for display for guiding a user through a navigable network, as is typically the case for, e.g., a PND, it will be appreciated that generated navigation instructions may also, or alternatively, be provided to a functional module of a vehicle control system, such as an advanced driver assistance system (ADAS), or an autonomous driving (AD) module, for use thereby, e.g., for navigating a vehicle around the network. Navigation devices of the type described above thus provide a reliable means for enabling users to navigate from one location to another.

In addition to the route planning and navigation functionality described above, a navigation device is typically also operable to provide information to the user, regarding, e.g., an expected travel time (or, equivalently, an expected arrival time at a destination), or any other such routing information, as may be desired. This routing information, e.g. the expected travel/arrival time, is typically displayed to the user, together with the navigation instructions. In traditional navigation systems this routing information is determined by the routing module, in a generally similar fashion as the route planning is performed, e.g., but using a suitable cost function defined (solely) in terms of expected travel times. For example, the estimated travel time for a particular route can be obtained as a sum of the expected travel times for the individual segments along the route.

Thus, in a more traditional navigation system the routing module is operable to calculate an estimated travel time for a route using the electronic map and traffic information relevant to the route. This basically involves using average speed of travel along elements of the route, average turn times for junctions, current speed of travel, etc. A key aspect for providing an improved user experience is that the information generated by the navigation system is reliable, and accurately reflects or predicts the conditions experienced by users of the navigation system, e.g., and in particular, by providing accurate estimated travel times to the user.

However, in cases of unexpected changes to travel and traffic behaviour, the estimated travel times determined in this way by the route planning module may significantly deviate from the actual travel times. Furthermore, the development and validation of a new route planning algorithm, or the updating of the electronic map data, to account for the new travel and traffic conditions traditionally takes a substantial amount of development and testing time.

Accordingly, the Applicant has realised that there remains a need for improved, e.g. more dynamic, or faster, methods for determining estimated travel times.

SUMMARY OF THE INVENTION

In accordance with a first aspect of the present invention there is provided a method, preferably being at least partially implemented on a computer, for updating a model to be used by a routing module of a navigation system, the routing module being operable to determine an estimated travel time for a route extending through a navigable network from a start location in the navigable network to an end location in the navigable network, the navigable network being represented by an electronic map comprising a plurality of nodes connected by segments representing navigable elements of the navigable network, wherein the routing module determines an estimated travel time for a given route by:

obtaining a set of route data for the route, the route data identifying by reference to the electronic map representation of the navigable network a sequence of one or more navigable elements of the navigable network defining the route;

obtaining traffic data indicative of traffic conditions in the navigable network;

processing a set of model input values determined from the set of route data for the route and the obtained traffic data using a model that has been trained to generate from the set of model input values a corresponding output value useable when determining an estimated travel time for the route; and using the output value produced by the model for the route when determining the estimated travel time for the route;

the method comprising:

obtaining a set of new positional data that has been obtained from devices travelling within an area of the navigable network represented by the electronic map, the set of new positional data including one or more positional trace(s) representing respective trips taken within the navigable network, each positional trace comprising a sequence of positional data corresponding to the movement of a device along a respective path extending through the area of the navigable network from a start position to an end position in the area of the navigable network, each positional trace having an associated time period reflective of when the positional trace was recorded and each positional trace also having an associated recorded travel time corresponding to the time taken for the device to travel from the start position to the end position along the respective path for the selected positional trace;

adding one or more positional trace(s) from the set of new positional data into a data store of historic positional data, and using the data in the data store of historic positional data including the new positional trace(s) to provide a set of training data for training one or more machine learning algorithm for generating the model, wherein the training data comprises a plurality of respective data sets derived using respective, selected positional traces from within the data store of historic positional data, each data set in the set of training data comprising: a set of model input values characterising the selected positional trace and the traffic conditions in the area of the navigable network during the time period associated with the selected positional trace; and a corresponding model output value for the set of model input values, wherein the model output value is determined using the recorded travel time for the selected positional trace; and generating a new version of the model by training one or more machine learning algorithm based on the respective sets of model input and corresponding model output values for the data sets included in the set of training data;

the method further comprising:

selecting one or more positional trace(s) from within the set of new positional data for evaluating the performance of the current version of the model;

evaluating the performance of the current version of the model by comparing an estimated travel time determined by a routing module using the model with the recorded travel time for the positional trace(s) that were selected for evaluating the performance of the model; and in response to the evaluation of the performance of the current version of the model:

when it is determined based on the comparison of the estimated travel time determined using the model with the recorded travel time for the positional trace(s) that were selected for evaluating the performance of the model that the performance of the current version of the model is less than a threshold performance value, determining that a change in conditions associated with the navigable network (a 'pattern-breaking event') has occurred, and outputting an indication of this (i.e. an indication that a change in conditions associated with the navigable network has occurred).

The present invention generally relates to techniques for determining an estimated travel time for a route extending between start and end locations within a navigable network, in particular using suitably trained (machine learning) models, as will be explained further below. A first aspect of the present invention thus relates to methods for generating and/or updating, i.e. training, such models.

In other aspects and embodiments the present invention provides methods of using such models to determine estimated travel times.

For the avoidance of doubt, it will be understood that an "estimated travel time" for a route is a prediction of the time for a user travelling along the route to arrive at the end location, e.g. based on the current conditions within the navigable network. Such estimated travel times are typical outputs of navigation systems and are usually provided, e.g. for display, to a user of the navigation system. This may be done, e.g., either by indicating the estimated travel time, or by indicating the estimated arrival time at the end location, depending on the user's preference. The accuracy of these estimated travel times provided by a navigation system (e.g., compared to the actual travel time recorded by a user) is a key element for an improved user experience and developers of navigation systems expend considerable effort attempting to improve the estimated travel times.

According to the present invention, the model that is used by the routing module when determining the estimated travel times is generated by suitable training of one or more machine learning algorithm using historic positional data that has been obtained from devices travelling within the navigable network as the training data for the machine learning algorithm. In this respect the present invention has recognised that the application of machine learning techniques to the present context is particularly advantageous since there is already a large amount of, readily available, historic positional data that can serve as 'ground truth' for training and testing the model. Furthermore, new positional traces are continually being recorded by users of the navigable network that can be added into the data store of historic positional data, and hence into the training set for the model. As data for new positional traces is obtained over time, the new positional traces can thus be added into a suitable data store of historic positional data, and processed accordingly into suitable training data for training the model.

Thus, it is a benefit of the approach according to embodiments of the present invention that as and when new positional data is obtained, the new positional data can be added to the data store of historic positional data, and used to continually update, i.e. re-train, and improve the model, and thereby refine the model over time (e.g. by reducing the error associated with the estimated travel times). For instance, the model is preferably periodically updated, e.g., once every day, e.g. using the set of recorded positional data from the previous 24 hours. Other arrangements would of course be possible.

A further benefit of the use of such positional data, is that the newly obtained positional traces (as well as the historic positional traces) also naturally provide a suitable set of test data for testing and evaluating the performance of the model, since the actual recorded travel times associated with the historic positional traces are generally known, or can be determined, and can therefore be compared with estimated travel times predicted using the model. For instance, in this way it is possible to automatically validate any changes in the model by ensuring that the model does provide improved estimated travel times at least for a suitable set of test data (traces) (and if not, then it is possible to, e.g., update the training set and re-train the model appropriately until the model does provide the desired improvements). For example, at least some of the newly obtained positional traces can be, and preferably are, used for such testing purposes, as will be explained further below. Compared to more traditional approaches for determining estimated travel times, the use of such a trained model thus provides the benefit that it can be more easily, e.g., and preferably automatically, updated over time to improve the accuracy of the estimated travel times determined using the model.

Through the continual re-training/testing of the model, the model may also be better able to detect and account for changes in user behaviour or conditions within the navigable network. For instance, it is recognised that a real navigable network is typically a dynamic network, and that conditions within the network may change over time, e.g. in response to infrastructure changes, or temporary changes such as road works. The continual training of the model using new positional data in the manner described above is very good at adapting over time to gradual changes in the navigable network, or new patterns of user behaviour, to ensure that the model continues to provide more accurate estimated travel times. Thus, the use of new positional data to continually re-train and refine the model over time works well to capture gradual changes in the conditions within the navigable network.

This may be particularly beneficial for capturing relatively smaller scale changes in the navigable network that occur in between larger scale updates of the routing algorithm and/or electronic map data, and/or for correcting for smaller scale errors (or bias) that may exist in the routing algorithm and/or electronic map data. For instance, developing and validating new routing algorithms and map updates is typically relatively time-consuming and labour intensive. Thus, by using a suitable model that is able to adapt to gradual changes in the conditions within the navigable network over time, it is possible to try to account for the new patterns of behaviour, in a manner that could not otherwise be done without having to spend significant cost and time developing a new route planning algorithm, or updating the electronic map, to reflect the changes.

The use of such a model can therefore, at least on average, provide improved estimated travel times, i.e. that typically better match the actual recorded travel times that users of the navigable network will experience.

However, the present invention further recognises that within a real navigable network there may also be very sudden changes, e.g. due to a road closure, or change in speed limit, etc., that are not well captured by continually and gradually re-training the model in this way. In such cases a model that has been trained using historic positional data may suddenly no longer be appropriate for the navigable network, and may give wildly inaccurate estimated travel times. Thus, the present invention further recognises that when using such a model it is desirable to be able to identify any such 'pattern breaking events', and to act appropriately. For instance, in response to a sudden change in the network conditions, it may be appropriate to discard some or all of the historic positional data and then appropriately re-generate/train the model using only newer positional data and/or using updated electronic map data such that the model hopefully more accurately reflects the current conditions within the navigable network, or even to (temporarily) stop using the model if it would give less accurate results than more traditional approaches.

Thus, alongside the gradual refinement of the model over time as new positional data is obtained, the present invention also provides a so-called 'pattern-breaking' detection step, whereby the performance of the current version of the model is evaluated using the newly obtained positional data, and where it is found that the model is no longer accurate, e.g. such that the performance is worse than a set performance threshold, it is thereby determined that a change in the conditions associated with the navigable network (a 'pattern-breaking event') may have occurred. When a pattern-breaking event is detected in this way, an indication of this may be outputted (either to a user, or to the system itself), and then acted on appropriately.

Thus, according to the present invention, the newly obtained positional data can be (and is) used in two main ways; firstly, the newly obtained positional data can be used to continually re-train the model, e.g. to capture gradual refinements or changes in the navigable network; secondly, the newly obtained positional data can also be used to evaluate the performance of the model, to confirm that the current version of the model is still reflective of the conditions in the navigable network, and that there have not been any sudden changes to the underlying navigable network that would mean that the model is no longer accurately reflective of the conditions in the navigable network. The present invention therefore provides a powerful approach for generating such models for use in determining estimated travel times that allows the model to be refined over time to give improved estimated travel times, whilst also dealing with potential sudden changes in the conditions in the real navigable network that may otherwise distort the performance of the model.

It will be appreciated that the steps of generating the new version of the model and of evaluating the current performance of the model can in principle be performed in any order, and at any time. In preferred embodiments the steps are performed when (and preferably whenever) a set of new positional data is obtained. For instance, and in a preferred embodiment, the set of new positional data may correspond to all of the recorded positional data within a certain time interval, e.g. within the past 24 hours. Thus, the steps may be performed on a daily basis. Various other arrangements would be possible in this regard.

The step of evaluating the current performance of the model may in some embodiments be performed after the model has been updated using the set of new positional data. That is, whenever new positional data is obtained, this may always be used to immediately update the model, before any attempt to evaluate the performance of the model is made. However, in other, more preferred embodiments, an initial step of evaluating the current performance of the model is performed using the new positional data before the new positional data is used to update the model. Thus, when a set of new positional data is obtained, the current version of the model is preferably first evaluated using a selected one or more positional trace(s) from the new positional data, to check that the current version of the model is still sufficiently accurately reflective of the conditions within the navigable network. Provided that the performance of the model is satisfactory (greater than or equal to the model performance threshold), the new positional data can then be processed into training data and used to re-train the model, to thereby generate a new version of the model. In this way it can be first checked that there has been no sudden change in the conditions within the network before performing the relatively computationally expensive training of the new version of the model. Correspondingly, when it is determined that there has been a pattern-breaking event, appropriate action can be taken prior to attempting to generate the new version of the model.

Accordingly, in a preferred embodiment, the 'pattern-breaking' detection step is performed when (and preferably whenever) a new set of positional data is obtained, before adding the new set of positional data into the data store of historic positional data and updating the model. Thus, preferably, whenever a new set of positional data is obtained (e.g. representing positional data from within the last 24 hours, or so), before attempting to use this positional data to update the model, a selected number of traces from with the new positional data are first used to evaluate the performance of the current version of the model. Preferably the model is evaluated using a plurality of new positional traces, e.g. in order to be able to average out any outliers. Other suitable techniques for removing outliers can also be used, as desired.

Provided that it is determined based on the evaluation step that the performance of the current version of the model is acceptable (e.g. is equal to or greater than a defined performance threshold), the new positional data can then be added to the data store of historic positional data, and then incorporated into the training data and used to generate an updated (new) version of the model. The updated version of the model can then be provided for output for use by the routing module. The updated model could always be provided for output whenever it is generated. However, in preferred embodiments, before provided the updated model for output, the performance of the updated model is evaluated and compared to the performance of the previous version of the model. This validation step ensures that the updated model actually provides an improvement (and if not, then the updated model may be discarded, and the current version of the model maintained). The validation step can be performed using any of the historic positional traces. Preferably the validation of the updated model uses at least some recent traces, e.g. from the newly obtained set of positional data. Preferably the validation of the updated model also uses a number of ('gold standard') positional traces that are known to be accurate (or at least expected to be, e.g. since they have been obtained by a test driver for this purpose, or are otherwise known to accurately reflect the actual driving conditions at that point in time at which they were recorded).

Thus, in a particularly preferred embodiment, when (and preferably whenever) a new set of positional data is obtained, the method comprises the steps of selecting one or more positional traces from within the new set of positional data for evaluating the performance of the current version of the model; and evaluating the performance of the current version of the model by comparing an estimated travel time determined by a routing module using the model with the recorded travel time for the selected positional trace(s) from within the new positional data.

In that case, in response to the evaluation of the performance of the current version of the model: when it is determined based on the comparison of the estimated travel time determined using the model with the recorded travel time for the selected positional trace(s) that the performance of the current version of the model is greater than or equal to a threshold performance value: the method comprises the steps of: adding the positional traces from the new set of positional data into a data store of historic positional data, and using the data store of historic positional data including the new positional traces to determine a set of training data for training one or more machine learning algorithm for generating the model, wherein the determined set of training data comprises a plurality of respective data sets derived using respective, selected positional traces from within the data store of historic positional data, each data set comprising: a set of model input values characterising the selected positional trace and the traffic conditions in the area of the navigable network during a first time period associated with the selected positional trace; and a corresponding model output value for the set of model input values, wherein the model output value is determined using the recorded travel time for the selected positional trace; and generating an updated model by training one or more machine learning algorithm based on the respective sets of model input and corresponding model output values for the data sets included in the set of training data.

On the other hand, and as mentioned above, when it is determined based on the evaluation step that the performance of the current version of the model for the selected positional trace(s) is below the desired performance threshold, this may indicate that a change in the conditions in the navigable network (a 'pattern breaking' event) has occurred. Thus, in response to determining that the performance of the current version of the model falls below the desired performance threshold, it is determined that some pattern breaking event has occurred, and this can be flagged appropriately. For instance, an indication of this may be flagged to the product development team for investigation (e.g. by way of an e-mail alert). Or, this may be flagged to trigger an automatic attempt at improving the model. For example, and in some preferred embodiments, in response to detecting that the performance of the current version of model falls below the desired performance threshold, the system may be (and in embodiments is) caused to discard some or all of the historic positional data and to generate a new, refreshed set of training data. For instance, in some cases, all of the previous training data may be discarded and a new set of training data comprising only of data generated from the newly obtained positional data may be constructed. The new training data can then be used to generate a new, initial (bootstrapped) version of the model, which can then be tested appropriately to see whether there is any improvement. If there is an improvement, this model can then be refined over time by the gradual training described above as and when new positional data is obtained.

As another example, in response to determining that a change in conditions associated with the navigable network has occurred, the system may be prompted to check for updates to the routing module and/or the electronic map data itself. If the routing module and/or electronic map data has been updated, then system may then be arranged to generate a new set of training data using the updated information, and to generate a new model accordingly. For instance, the routing module, at least in preferred embodiments, determines an estimated travel time using a routing algorithm that comprises a weighted cost function that performs a weighted sum of the estimated travel times (costs) along each segment along the route (with the model in that case preferably comprising a 'bias' model that is used to correct the estimated travel times determined by the routing module in this way to account for any systematic errors or bias within the electronic map data and/or the routing algorithm). In that case, the estimated travel times (costs) are preferably determined from the electronic map data and the weights are carefully designed to give accurate estimated travel times. The electronic map data and routing algorithm are routinely updated, although this requires significant development effort (hence the use of the model as described herein).

Thus, when it is determined that a change in conditions associated with the navigable network has occurred, this may have already have been captured in an update to the electronic map data and routing algorithm, but not yet captured by the model, which has been trained using the historic positional data together with the previous version of the electronic map data and routing algorithm. In that case, in response to determining that a change in conditions associated with the navigable network has occurred, it should first be checked whether there have been any updates to the electronic map data and/or routing algorithm, and if so, a new set of training data is preferably generated from at least some of the historic positional data using the updated electronic map data and/or routing algorithm to generate a new model, which can then be tested against the newly obtained positional data to check whether this captures the new conditions in the navigable network. Thus, in preferred embodiments, in response to the determining that a change in conditions associated with the navigable network has occurred, the method comprises: checking whether there have been any updates to the routing module (e.g. to the routing algorithm used by the routing module) and/or the data in the electronic map. The method then preferably comprises updating the routing module and/or the data in the electronic map and re-processing the historic positional data using the updated routing module and/or data in the electronic map to provide a new set of training data; and generating a new version of the model using the new set of training data. The performance of the new version of the model can then be evaluated. If the new version of the model is performing sufficiently well this version of the model can then be used, and provided for output, accordingly.

Otherwise, if there is still no improvement, this may need further investigation and larger scale changes (e.g. to the map data itself). Thus, if there is still pattern-breaking being observed, even after discarding some or all of the training data and/or even after checking for updates to the electronic map data or the routing module, then this may be flagged, e.g. to prompt an update to the routing algorithm and/or electronic map data. In that case the routing module may temporarily stop using the model and return to generating estimated travel times, e.g. in the traditional way. This may resolve itself as and when further positional data is obtained and so the model may continue to be trained and updated until an improvement is observed. Various other arrangements would be possible in this regard.

Accordingly, in a particularly preferred embodiment, there is provided a method for updating a model to be used by a routing module of a navigation system, the routing module being operable to determine an estimated travel time for a route extending through a navigable network from a start location in the navigable network to an end location in the navigable network, the navigable network being represented by an electronic map comprising a plurality of nodes connected by segments representing navigable elements of the navigable network, wherein the routing module determines an estimated travel time for a route by: obtaining a set of route data for the route, the route data identifying by reference to the electronic map representation of the navigable network a sequence of one or more navigable elements of the navigable network defining the route; obtaining traffic data indicative of traffic conditions in the navigable network; processing a set of model input values determined from the set of route data for the route and the obtained traffic data using a model that has been trained to generate from the set of model input values a corresponding output value useable in determining an estimated travel time for the route; and determining using the output value produced by the model for the route an estimated travel time for the route, the method comprising: obtaining a new set of positional data, the new set of positional data including one or more positional traces representing respective trips taken within the navigable network within a certain time interval, each positional trace comprising a sequence of positional data corresponding to the movement of a device along a respective path extending through the area of the navigable network from a start position to an end position in the area of the navigable network, and having an associated recorded travel time corresponding to the time taken for the device to travel from the start position to the end position along the respective path for the selected positional trace; selecting one or more positional traces from within the new set of positional data for evaluating the performance of the current version of the model; evaluating the performance of the current version of the model by comparing an estimated travel time determined by a routing module using the model with the recorded travel time for the selected positional trace(s) from within the new positional data. In response to the evaluation of the performance of the current version of the model: when it is determined based on the comparison of the estimated travel time determined using the model with the recorded travel time for the selected positional trace(s) that the performance of the current version of the model is greater than or equal to a threshold performance value: the method further comprises using the historic positional data including the new set of positional data to determine a set of training data for training one or more machine learning algorithm for generating the model, wherein the determined set of training data comprises a plurality of respective data sets derived using respective, selected positional traces from within the data store of historic positional data, each data set comprising: a set of model input values characterising the selected positional trace and the traffic conditions in the area of the navigable network during a first time period associated with the selected positional trace; and a corresponding model output value for the set of model input values, wherein the model output value is determined using the recorded travel time for the selected positional trace; and generating an updated model by training one or more machine learning algorithm based on the respective sets of model input and corresponding model output values for the data sets included in the set of training data; whereas when it is determined based on the comparison of the estimated travel time determined using the model with the recorded travel time for the selected positional trace(s) that the performance of the current version of the model is less than the threshold performance value, determining that a pattern-breaking event has occurred, and outputting an indication of this.

It will be appreciated that the present invention may therefore provide various benefits compared to other possible approaches.

For instance, in more traditional navigation systems, the estimated travel time for a route is typically determined by determining expected travel times for the individual navigable elements along the route and then summing the expected travel times for the individual navigable elements along the route to give the total estimated travel time for the route. The travel time values for the individual navigable elements can be obtained from the current version of the electronic map, together with any relevant 'live' traffic, etc., data for the route. The expected travel time for a given navigable element may thus be determined from the average travel speed for the navigable element, together with the length of the navigable element, which information is typically stored in the electronic map. The traffic, etc., data can, for example, be used to modify the average travel speeds. This approach is generally well understood in the art.

In contrast, in embodiments of the present invention, rather than determining an expected travel time for a route using (only) a cost function with input values taken directly from the information in the electronic map, e.g. as may be more traditionally done, the determination of the estimated travel time for the route uses a trained model (which may, e.g., and preferably does, comprise a neural network, a decision tree, or any other suitable (machine learning) model that can be trained in the manner described herein) that takes as its input parameters a suitable set of data values (i.e. model input values) characterising the route in question, preferably including one or data values characterising the traffic (and optionally also weather) conditions in the area of the navigable network relevant to the route, and then generates a corresponding output value from the input set of characteristic data values (the model input values) for the route, which output value can then be used when determining the estimated travel time for the route.

For instance, in some embodiments, the model may be configured to directly generate an estimated travel time for a given route from an appropriate input set of characteristic data values for the route, such that the model output is directly representative of the estimated travel time (although the model output may of course still be subject to further processing, e.g., to convert it into a format suitable for display). In that case, the step of using the model output to determine the estimated travel time may comprise providing the model output itself as the estimated travel time.

In other more preferred embodiments, however, the model output value may be indicative of an expected 'bias' value associated with the input set of characteristic data values, which bias value can then be used to adjust, or correct, an initial estimated travel time for the route (which initial estimated travel time may have been determined in any suitable manner, as desired, e.g. using the more traditional approach described above). That is, the model output may be a 'bias' value that is used to correct an estimated travel time, e.g. that has been determined in the normal way. This approach can be particularly effective as the bias model can be used, and regularly updated, for adapting the estimated travel times to relatively smaller changes in the navigable network, and/or to correct for relatively smaller errors in the routing algorithm and/or electronic map data, to help ensure that the routing module using the model provides more accurate estimated travel times, without having to perform larger scale updates to the routing algorithm and/or electronic map data. The bias model can thus be used and updated in between such larger scale updates to help improve the accuracy of the estimated travel times.

However, other arrangements would be possible and in general the model may be arranged to provide for a given input set of characteristic data values any desired output value that may suitably be used as part of a process for determining an expected travel time.

As mentioned above, the first aspect of the present invention generally relates to a method for generating, e.g. training, a model for use in determining estimated travel times. According to the present invention the model that is used in embodiments and aspects of the present invention is generated (e.g., and preferably trained) using historic positional data. Preferably the model is generated and updated by a process of iterative supervised machine learning. That is, the training of the model is performed using one or more machine learning algorithm that refines the model based on feedback data in the form of, e.g., the actual recorded travel times for the historic positional traces. The model may therefore be any model that can suitably be trained in this manner. Thus, in embodiments, the model may comprise a neural network, or a decision tree. However, any other suitable types of model could also be used.

In particular, the model is preferably trained using a set of labelled training data including a set of model input values and their corresponding (desired) model output values generated from a plurality of historic positional traces. The machine learning algorithm in that case will then analyse the set of training data to infer a model that, in effect, optimises the mapping between the model input values and the corresponding desired model output values over the entire training set. The model generated in this way can then be applied to new data, e.g. by processing the data to generate a suitable set of model input values that can then be passed to the model which then produces a corresponding model output value. The principles of "supervised" machine learning are generally well understood and it will be appreciated that embodiments may use any suitable and desired supervised machine learning algorithm. In principle the present invention could also be implemented using "unsupervised" machine learning techniques in which the set of training data is provided to the machine learning algorithm without explicit labelling of the desired output values, and wherein the machine learning process builds the relevant feature associations itself. In that case, the data sets forming the set of training data will still include the generated model input and model output values but the mapping between the input and output values will not be provided to the machine learning algorithm(s) and instead the machine learning itself will determine the appropriate data structures, e.g. by a process of clustering the data.

It will be understood that a positional trace comprises a respective sequence of positional data corresponding to the movement of a device along a path extending through the area of the navigable network. The historic positional traces therefore, in effect, represent historical routes, for which the actual recorded travel times are known, and which can therefore be processed to generate suitable data sets based on which a model can be appropriately trained to give a desired output for use in estimating travel times. For instance, each historic positional trace (i.e. route) can be processed to generate a respective data set including a characteristic set of data values for the path associated with the positional trace (i.e. the input parameters for the model) and a desired model output for those input parameters (which may, e.g., be an estimated travel time, a bias value, etc.). The data sets generated in this way from a plurality of historic positional traces can thus be used to generated a suitable set of training data (a training set) that can be provided to a machine learning algorithm in order to train the model to give the desired outputs. Any newly obtained positional data (traces) can then be added into a suitable data store of historic positional data, and processed into training data in the same way.

In particular, in the present invention, positional traces in the data store of historic positional data are preferably processed into training data as follows. Firstly, a positional trace from within the data store of historic positional data is selected. The selected positional trace is then processed into a suitable format for inclusion into the data set, e.g. depending on the form of the model that is being generated. The data set should generally contain a set of one or more model input values, which will characterise the positional trace in question, and also characterise any other relevant conditions within the navigable network (e.g. traffic, weather, etc.), together with a corresponding model output value.

Thus, in embodiments, determining training data from the data store of historic positional data comprises: selecting a positional trace from a data store of historic positional data that has been obtained from devices travelling within an area of the navigable network represented by the electronic map, the selected positional trace comprising a sequence of positional data corresponding to the movement of a device along a path extending through the area of the navigable network from a start position to an end position in the area of the navigable network. A recorded travel time for the selected positional trace is then obtained, wherein the recorded travel time corresponding to the time taken for the device to travel from the start position to the end position along the respective path for the selected positional trace can be determined. This may be obtained directly from the data store of historic positional data (where this information is stored in the data store of historic positional data) or may otherwise be calculated from the information in the data store of historic positional data. At the same time, a set of historic traffic data indicative of traffic conditions in the area of the navigable network during a first time period associated with the selected positional trace is also obtained. This 'traffic snapshot' can be obtained in various ways, e.g. as will be explained further below. Any other suitable information that may desirably be incorporated into the model, e.g. regarding historic weather conditions, or the like, may be also be obtained at this stage.

The selected positional trace is then processed to generate from the selected positional trace a respective data set comprising: a set of model input values characterising the selected positional trace and the traffic conditions in the area of the navigable network during the first time period associated with the selected positional trace; and a corresponding (desired) model output value for the set of model input values, wherein the corresponding (desired) model output for the set of model input values is determined using the recorded travel time for the selected positional trace. The respective data set generated from the selected positional trace can then be included into a set of training data for generating the model.

This is preferably repeated for a plurality of suitably selected positional traces such that the set of training data thereby comprises a plurality of data sets each including a respective set of model input values and a corresponding model output value. For instance, whilst various embodiments are described herein with reference to selection of a single positional trace, for ease of illustration, it will be appreciated that in general the testing of the present invention will preferably select a plurality of positional traces. Thus, in preferred embodiments, a plurality of positional traces are selected, each of which is then processed in the manner described herein and added into the training set.

Thus whilst various embodiments are described above in relation to selecting a single historical positional trace it will be appreciated that in general these steps may be, and typically, are repeated for a plurality of selected historical positional traces in order to build up a suitable set of training data including a plurality of such data sets (each including respective sets of model input values and a corresponding model out value) for a respective plurality of selected historical positional traces. Indeed, a benefit of the present invention is that by using historic positional data in the manner described herein it is possible to train the model using a relatively large number of test traces, to thereby improve and quantify the confidence associated with the model.

In embodiments the present invention thus selects from the data store of historic positional data one or more positional traces to be used as part of the training data set. The selection of the positional traces may be made in any desired fashion. For example, a positional trace may generally be selected on the basis of one or more trace selection parameters which may be defined by a user of the evaluation system, e.g. depending on the testing that is to be performed. For instance, typical trace selection parameters may include one or more of: a time of day, a day of the week, a selected time period, a map area (city, state, country), a trace length, a trace duration, a trace dominant functional road class, a mode of transport (car, motorcycle, truck, etc.). Thus, in embodiments, rather than generating a model that can be used over the entire map, positional traces are selected only from a smaller area of interest within the map. Similarly, rather than considering the entire time period for which positional data is available, positional traces may be selected that appear during a time interval of interest. A positional trace is then selected from the data store that matches the desired trace selection parameters for use in generating the model.

According to preferred embodiments of the first aspect, the method comprises a step of obtaining and/or using positional data, and associated timing data, relating to the movement of a plurality of devices along navigable elements of the navigable network as represented by the electronic map data. The positional data may provide data indicative of the historic movement of the plurality of devices along the navigable elements with respect to time. By "historic" it is meant positional data that has been previously obtained and stored (as opposed to "live" data that has been received from devices in the relatively recent past, e.g. within the last 30 minutes, and thus reflects the current conditions in the navigable network). As mentioned above, a benefit of using historic positional data in the present invention is that there is a large amount of such data already available, which thus represents a useful set of training and test data in a format that can be immediately explored, over a wide range of traffic conditions and time periods. Furthermore, new data is obtained all of the time that can be added into the data store of historic positional data. However, in principle the present invention could also utilise some "live" data, in a similar fashion, either for training or testing purposes.

The positional data that is used in accordance with the invention is positional data relating to the movement of a plurality of devices along the navigable elements of the navigable network. The historic positional data is stored in a suitable data store, e.g. a database, from which it can be accessed, and used, as desired. The data store of historic positional data is thus populated over time by recording "live" positional data, and storing the recorded positional data, together with associated timing data, and any other desired information that may be stored for the positional data. The present invention thus preferably comprises accessing such data store of historic positional data, and extracting the required data therefrom. The generation of the historic data store is therefore preferably performed independently from, and preferably occurs at a different (earlier) time, to the evaluation techniques of the present invention. However, in embodiments, the method may also comprise a prior step of obtaining positional data and associated timing data relating to the movement of a plurality of devices in the navigable network, optionally filtering the positional data to obtain positional data and associated timing data relating to the movement of a plurality of devices along the or each given navigable element, and adding the positional data into the data store.

In embodiments the historic positional data stored in the data store may be periodically 'pruned', e.g. by discarding some of the historic positional data, e.g. according to a suitable refresh policy. For example, it may be desirable to periodically remove older data from the data store, to allow the training data to be effectively refreshed as new, and potentially more reflective, data is obtained. Thus, in an embodiment, any data that was recorded outside of a threshold interval (e.g. outside of the last six months) may be discarded from the data store. Various other arrangements would be possible in that regard.

The historic positional data that is used in accordance with the invention is collected from one or more, and preferably multiple, devices, and relates to the movement of the devices with respect to time. Thus, the devices are mobile devices. It will be appreciated that at least some of the positional data is associated with temporal data, e.g. a timestamp. In preferred embodiments all positional data is associated with temporal data, e.g. a timestamp. However, it will be appreciated that timing data may alternatively, or additionally, be associated with a "trace" including a set of positional data "fixes" obtained by a device, rather than directly with each individual positional data fix. For example, each positional data "fix" may be associated with an offset relative to a time associated with a trace. Or, in some cases, timing data may be stored only for the "trace" as a whole, e.g. by storing the start/end times for the "trace", without storing any timing data for the intermediate "fixes". This may provide less detailed information but might nevertheless be desirable, e.g. for data privacy reasons.

Thus, the positional data and associated timing data relates to the movement of devices, and may be used to provide a positional "trace" of the path taken by a particular device. The devices for which the positional data is stored may be any mobile devices that are capable of providing such positional data and sufficient associated timing data for the purposes of the present invention. The devices may be any device having position determining capability. For example, such a device may comprise means for accessing and receiving information from WiFi access points or cellular communication networks, such as a GSM device, and using this information to determine its location. In preferred embodiments, however, the devices from which positional data is obtained comprise a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

The devices from which the positional data is obtained are preferably associated with a respective vehicle. In these embodiments the position of a device will correspond to the position of the associated vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The devices may be integrated with the vehicle, or may be a separate device associated with the vehicle such as a portable navigation apparatus. Of course, the positional data may be obtained from a combination of different devices, or a single type of device. Typically the positional data is stored in an anonymised fashion (for data privacy reasons), such that it is not possible to identify the specific end user, or device, from which a given set of positional data has been obtained. However, information identifying the type of device and/or type of vehicle associated with the positional data may in embodiments be stored together with the positional data.

The positional data obtained from the plurality of devices is commonly known as "probe data". Data obtained from devices associated with vehicles may be referred to as vehicle probe data (or sometimes as floating car data). References to "positional data" herein should therefore be understood as being interchangeable with the term "probe data", and the positional data may be referred to as probe data for brevity herein.

The historic positional data may be stored, and processed, in any suitable format, as desired. However, as mentioned above, at least some of the positional data is stored, or at least can be accessed, in the form of positional "traces" (wherein a positional "trace" comprises a sequence of positional data obtained from a particular device). The positional trace thus corresponds to the movement of a single device along a path through the area of the navigable network, the positional trace typically corresponding to a single trip through the navigable network. The respective path associated with the positional trace will thus extend between a start and end position in the navigable network, and corresponds to an actual trip that performed by the device in question.

The positional trace will therefore also be associated with a certain time period. For instance, the positional trace will generally be associated with timing data, e.g. time stamps, indicating at least the start time and end time for the trip represented by the positional trace, and the associated time period may thus be the actual time at which the trip was made, with that timing data being stored directly. For instance, in embodiments associated timing data may be stored for the full positional trace. However, as explained above, this need not be done, and in other embodiments precise timing data is not stored (or at least not used for the purposes of the present invention), and for the purposes of the present invention the positional traces may be otherwise associated with a time period. For example, rather than using individual timing data for each positional trace, the positional traces may be sorted, or 'binned', according to a particular predetermined interval of time (e.g. a positional trace recorded between 9:17 and 9:38 may be sorted into a 'bin' associated with the time interval 9:00 to 10:00 AM, and so on), and thereby associated with that time interval. Various other options would be possible in this regard and it is important only that the time period associated with a positional trace is suitable for the purposes of the present invention (e.g. for obtaining relevant traffic data, etc., for that time period to allow a meaningful evaluation to be performed), and the precise form of the timing data stored for a positional trace is not significant.

For the purposes of the present invention, it may be necessary to determine (actual) recorded travel times for at least some of the historic positional traces. Thus, in the present invention, the historic positional traces are preferably associated with timing data from which a recorded travel time for the selected positional trace corresponding to the time taken for the device to travel from the start position to the end position along the respective path for the selected positional trace can be determined. Data indicative of the recorded travel times may be stored together with the positional traces in the data store of historic positional data. This may be stored directly as part of the positional data. Or, the recorded travel time for a trace may be determined from the data in the data store of historic positional data. For example, where (at least) the start and end times for a given positional trace are stored, the recorded travel time can then be calculated as the difference between these time values.

The determination of the estimated travel time for a given route should also, and preferably does, take into account traffic conditions in the navigable network that are relevant to the route. Correspondingly, the generation and training of the model using the historic positional traces should take into account the historic traffic conditions in the area of the navigable network during the time period associated with the selected positional trace.

There may be some average traffic information included into the electronic map data itself, e.g. representative of rush hour traffic conditions. These attributes may be stored for segments within the electronic map data and may act as a modifier for the average speed data (and hence travel times) associated with the segments in the electronic map data. However, this information is typically unspecific and does not (and cannot) reflect the actual traffic conditions in the network at any particular moment in time. For instance, traffic conditions are highly dynamic and can be highly unpredictable. In typical navigation systems, traffic information is therefore normally generated, and reported in a "live" fashion. Thus, in a "live" navigation system, traffic information is normally obtained from a variety of different sources, and is typically compiled at a traffic server before being distributed to the navigation devices within the navigable network.

This means that because the training of the model in embodiments of the present invention is performed using historic positional traces it is desirable to be able to extract traffic information that is relevant to that positional trace, i.e. which is associated with the same time period as the selected positional trace. This then allows the training of the model to take into account the actual traffic conditions, which in turn means that the model can take the current traffic information as an explicit input when the model is being used in a live environment To achieve this, in embodiments, a 'snapshot' of the actual traffic conditions in the navigable network, or at least in the area of the navigable network associated with the selected positional trace, at the time period associated with the positional trace is preferably generated. The historic traffic snapshot effectively represents the 'live' traffic conditions in the navigable network at the time at which the positional trace was recorded, and can accordingly be provided to the routing module for use when determining the cost value for the selected positional trace.

The traffic snapshot may be generated in any suitable fashion, as desired. For instance, if the live traffic information was recorded in a traffic data base, the historic traffic data for the time period of interest could be obtained appropriately, and then provided to the routing module for the testing. However, presently, "live" traffic information from most traffic sources is not recorded. Thus, in a particularly preferred embodiment, the historic traffic snapshot is generated using the historic positional data from, or around, the time period of the selected positional trace. That is, the present application recognises that the historic positional data itself can also be used to determine the traffic conditions in the navigable network at the time that the historic positional data was recorded. In that respect, it will be appreciated that there are various known techniques for generating traffic information from positional data, and an example of this is described, for instance, in WO-2019/158438, in the name of TomTom Traffic B.V., filed on 8 Feb. 2019, and claiming a priority date of 14 Feb. 2018, the contents of which are incorporated herein by reference. Another example is described in US-2015/0120174 (HERE GLOBAL B.V.). The present application recognises that such techniques can also suitably be applied to historic positional data. Any suitable such techniques may be used for generating the traffic snapshot, as desired.

Thus, in embodiments, the step of obtaining the set of historic traffic data indicative of traffic conditions in the area of the navigable network during the first time period associated with the selected positional trace comprises: obtaining positional data in the area of the navigable network during the first time period associated with the selected positional trace; and generating the set of historic traffic data using the obtained positional data.

The traffic snapshot may be generated in a prior step, and a series of traffic snapshots stored for different time intervals. In that case, once a positional trace has been selected, having an associated time period, the appropriate traffic snapshot for that time period can then be obtained. Alternatively, the method may comprise the step of generating the traffic snapshot from the historic positional data. For example, in that case, once a positional trace has been selected, having an associated time period, the method may involve selecting (preferably all available) positional data for the time period of interest, or within a predetermined interval around the time period of interest, and using this to calculate a traffic snapshot for that time. Various arrangements would be possible in that regard. Preferably the traffic snapshot is generated at least for the segments of the navigable network along which the path associated with the selected positional trace extends. However, in embodiments, a traffic snapshot may be obtained for a larger area, e.g. for all segments of the navigable network within some predetermined distance of the path.

The historic traffic data, e.g. as determined from the traffic snapshot, can then be provided as an input parameter for training the model, e.g. in the manner described above.

Historic weather data may also be obtained and used when training the model, in an analogous manner to the historic traffic data. It will be appreciated that such historic weather data may preferably be obtained from a suitable data store of historic weather data. That is, historic weather data is already typically stored and maintained and can thus be accessed and associated with the relevant time period for a selected positional trace as desired. Thus, in embodiments, the method of generating the model comprises a step obtaining historic weather data indicative of weather conditions in the area of the navigable network during the first time period associated with the selected positional trace, and generating from the historic weather data a model input value for the set of model of input values in the data set generated for the selected positional trace that is indicative of the weather conditions in the navigable network for the time period. Correspondingly, when the model is subsequently used to determine an estimated travel time for a route, the method may then comprise obtaining weather data indicative of weather conditions in the navigable network, and providing a model input value determined from the obtained weather data to the model as part of the set of model of input values for the route for use in generating the output value.

In embodiments of the first aspect, the model is trained using information obtained from data stored in an electronic map representation of the navigable network. When processing the historic positional data, the model may therefore preferably use an earlier version of the electronic map, e.g. the version corresponding to the time period associated with the positional trace, where this is available. However, it will be appreciated that although the map data is periodically updated, the map data is relatively static, since changes to the underlying navigable network may be relatively infrequent. Thus, navigation systems typically always operate on somewhat historic map data. Thus, in some embodiments, the model can be trained using the current version of the map, without significantly impacting the accuracy (since changes to the underlying navigable network are relatively infrequent compared to changes in traffic conditions, and the use of model itself can account for changes in behaviour).

In the first aspect a set of training data is thus generated by processing a plurality of selected historic positional traces, e.g., in the manner described above, to determine for each of the selected historic positional traces a respective data set including suitable input parameters and corresponding desired output values for those input parameters. Thus, for each selected historic positional trace there is generated a respective data set comprising: a set of data values characterising the selected positional trace and the traffic conditions in the area of the navigable network during the first time period associated with the selected positional trace, the data values characterising the selected positional trace and the traffic conditions in the area of the navigable network during the first time period associated with the selected positional trace representing a set of input parameters for the model; and a corresponding desired model output value for the set of input parameters represented by the data values characterising the selected positional trace and the traffic conditions in the area of the navigable network during the first time period associated with the selected positional trace.

The desired model output for a given set of input parameters represents the model output that should desirably be generated from the set of input parameters (i.e. such that the model is trained to reproduce the desired model output from the set of input parameters). In the context of the present invention, where the model is used for generating travel time estimates, the desired model output for the set of input parameters represented by the data values characterising the selected positional trace and the traffic conditions in the area of the navigable network during the first time period associated with the selected positional trace can thus be (and is) determined using the recorded travel time for the selected positional trace. That is, the model is trained to provide an output that can be used to determine an estimated travel time for a given route, characterised in terms of a suitable set of input parameters, that more accurately reflects the actual/recorded travel time for that route. The form of the desired model output will of course depend on the nature of the model being generated, and how the model is to be used. Various arrangements would be possible in this regard.

For example, in an embodiment, the model is a bias model for adjusting estimated travel times determined by a route planning module of a navigation system. That is, in an embodiment, the method is performed in respect of a navigation system including a routing module, and wherein the output value produced by the model is a bias value for adjusting an initial estimated travel time previously determined by the routing module of the navigation system. In that case, the step of determining using the output value produced by the model for the route an estimated travel time for the route preferably comprises adjusting the initial estimated travel time for the route determined by the routing module of the navigation system using the output value produced by the model for the route to determine an adjusted estimated travel time for the route. The adjusted estimated travel time can then be provided for output, e.g. for display. Thus, when generating the model, the model output value for a (and each) selected positional trace in that case should be (and in embodiments is) a bias value indicative of a difference between the recorded travel time for the selected positional trace and an estimated travel time that has been determined for the selected positional trace by the route planning module of the navigation system using the historic traffic data for the selected positional trace. The model can then be trained to provide predictions of the bias associated with a given set of characteristic data values, which bias can then be used to adjust an estimated travel time, e.g. in the manner described above.

In this embodiment, the method may therefore comprise determining an initial estimated travel time for each selected positional trace using the routing module of the navigation system. This may be done in a traditional way, e.g. using a suitable cost function together with the electronic map data and the historic traffic data relevant for the time period associated with the selected positional trace. Thus, in some embodiments, particularly when the model is used to determine a bias value, the historic positional traces are processed to determine an expected travel time for the historic positional trace. This can be done by providing the historic positional trace to a routing module of the navigation system in question, and then determining the estimated travel time, e.g., in a conventional manner. For example, the routing module preferably has, or can generate, a suitable cost function for determining an expected travel time for a route. The actual cost values for the segments may be determined (in part) from the electronic map data, e.g. in the usual manner. For instance, the travel time cost for a particular segment represented in the electronic map may be stored directly in the electronic map, or may be determined using the expected travel speed and segment lengths stored in the electronic map. Similarly, the map data will also include other such information that can be used to define a cost in terms of other routing parameters, such as travel distances, number of turns, scenicity, and so on. The cost values are also determined using the traffic information. For instance, in a "live" navigation system, traffic information is normally obtained from a variety of different sources, and typically compiled at a traffic server before being distributed to the navigation devices within the navigable network. The traffic conditions are then used to modify the cost values based on the electronic map data. For example, the traffic conditions may be used to reduce or adjust the expected travel speed across a segment. In embodiments this can be done in a similar fashion using the historic traffic data, e.g. obtained as above. Thus, in embodiments of the first aspect of the present invention, once a suitable positional trace has been selected, and provided to the routing module, the routing module is also provided with electronic map data and (historic) traffic information, so that the routing module can determine the associated cost for the path associated with the positional trace (e.g. in a similar fashion as would be done when generating a route when performing "live" route planning, since the routing module is generally operable to calculate in the same way a cost for any route through the navigable network, i.e. regardless of whether the route was generated by the routing module or not).

It is believed that the method of generating a model from historic positional data may be novel and advantageous in its own right, in particular through the use of historic traffic data (e.g. in the form of a traffic snapshot, as described above) as a separate input to the model. The use of historic traffic data thus allows the model to be trained using the historic traffic data and historic positional data as separate model inputs, and accordingly allows an improved model that can take both of these into account when the model is being used by a routing module for determining an estimated travel time (or bias value), e.g. as described above.

In accordance with a second aspect of the present invention there is provided a method, preferably being at least partially implemented on a computer, for generating a model for use in determining an estimated travel time for a route extending through a navigable network, the navigable network being represented by an electronic map, the method comprising:

- selecting a positional trace from a data store of historic positional data that has been obtained from devices travelling within an area of the navigable network represented by the electronic map, the selected positional trace comprising a sequence of positional data corresponding to the movement of a device along a path extending through the area of the navigable network from a start position to an end position in the area of the navigable network;
- obtaining a recorded travel time for the selected positional trace, the recorded travel time corresponding to the time taken for the device to travel from the start position to the end position along the respective path for the selected positional trace can be determined;
- obtaining a set of historic traffic data indicative of traffic conditions in the area of the navigable network during a first time period associated with the selected positional trace;
- generating from the selected positional trace a respective data set comprising:
  - a set of model input values characterising the selected positional trace and the traffic conditions in the area of the navigable network during the first time period associated with the selected positional trace; and
  - a corresponding (desired) model output value for the set of model input values, wherein the corresponding (desired) model output for the set of model input values is determined using the recorded travel time for the selected positional trace;

the method further comprising:

- including the respective data set generated from the selected positional trace into a set of training data for generating the model, the set of training data comprising a plurality of data sets each including a respective set of model input values and a corresponding model output value; and
- generating the model by training the one or more machine learning algorithm based on the respective sets of model input and corresponding model output values for the data sets included in the set of training data.

It will be appreciated however that the bias model could in principle be used to determine an expected travel time for a route without providing the traffic data as an explicit input to the bias model (since the traffic conditions will already be taken into account when generating the initial estimated travel time that is to be corrected). In that case, the bias model is implicitly trained using traffic data since will affect the bias values (since the bias is determined using the difference between the recorded travel time and an estimated travel time determined using the historic traffic data). However, when the model is subsequently used to predict an estimated travel time for a given route, the traffic data is in some embodiments not explicitly provided as an input parameter.

Thus, according to another aspect of the present invention, there is provided a method for updating a model to be used by a routing module of a navigation system, the routing module being operable to determine an estimated travel time for a route extending through a navigable network from a start location in the navigable network to an end location in the navigable network, the navigable network being represented by an electronic map comprising a plurality of nodes connected by segments representing navigable elements of the navigable network, wherein the routing module determines an estimated travel time for a given route by:

- obtaining a set of route data for the route, the route data identifying by reference to the electronic map representation of the navigable network a sequence of one or more navigable elements of the navigable network defining the route;
- processing a set of model input values determined from the set of route data for the route using a model that has been trained to generate from the set of model input values a corresponding output value useable when determining an estimated travel time for the route; and
- using the output value produced by the model for the route when determining the estimated travel time for the route;

the method comprising:

- obtaining a set of new positional data that has been obtained from devices travelling within an area of the navigable network represented by the electronic map, the set of new positional data including one or more positional trace(s) representing respective trips taken within the navigable network, each positional trace comprising a sequence of positional data corresponding to the movement of a device along a respective path extending through the area of the navigable network from a start position to an end position in the area of the navigable network, each positional trace having an associated time period reflective of when the positional trace was recorded and each positional trace also having an associated recorded travel time corresponding to the time taken for the device to travel from the start position to the end position along the respective path for the selected positional trace;

adding one or more positional trace(s) from the set of new positional data into a data store of historic positional data, and using the data in the data store of historic positional data including the new positional trace(s) to provide a set of training data for training one or more machine learning algorithm for generating the model, wherein the training data comprises a plurality of respective data sets derived using respective, selected positional traces from within the data store of historic positional data, each data set in the set of training data comprising: a set of model input values characterising the selected positional trace; and a corresponding model output value for the set of model input values, wherein the model output value is determined using the recorded travel time for the selected positional trace; and generating a new version of the model by training one or more machine learning algorithm based on the respective sets of model input and corresponding model output values for the data sets included in the set of training data;

the method further comprising:

selecting one or more positional trace(s) from within the set of new positional data for evaluating the performance of the current version of the model;

evaluating the performance of the current version of the model by comparing an estimated travel time determined by a routing module using the model with the recorded travel time for the positional trace(s) that were selected for evaluating the performance of the model; and in response to the evaluation of the performance of the current version of the model: when it is determined based on the comparison of the estimated travel time determined using the model with the recorded travel time for the positional trace(s) that were selected for evaluating the performance of the model that the performance of the current version of the model is less than a threshold performance value, determining that a change in conditions associated with the navigable network has occurred, and outputting an indication that a change in conditions associated with the navigable network has occurred.

The invention also extends to methods of generating a model as such. Thus, from yet another aspect of the present invention, there is provided a method for generating a model for use in determining an estimated travel time for a route extending through a navigable network from a start location in the navigable network to an end location in the navigable network, the navigable network being represented by an electronic map comprising a plurality of nodes connected by segments representing navigable elements of the navigable network, the method comprising: selecting a positional trace from a data store of historic positional data that has been obtained from devices travelling within an area of the navigable network represented by the electronic map, the selected positional trace comprising a sequence of positional data corresponding to the movement of a device along a path extending through the area of the navigable network, the respective path for the selected positional trace extending between a start position and an end position in the area of the navigable network, and the selected positional trace being associated with timing data from which a recorded travel time for the selected positional trace corresponding to the time taken for the device to travel from the start position to the end position along the respective path for the selected positional trace can be determined; generating from the selected positional trace a respective data set comprising: a set of data values characterising the selected positional trace and the traffic conditions in the area of the navigable network during the first time period associated with the selected positional trace, the data values characterising the selected positional trace; and a model output value corresponding to the set of input parameters represented by the data values characterising the selected positional trace, wherein the model output for the set of input parameters represented by the data values characterising the selected positional trace and the traffic conditions in the area of the navigable network during the first time period associated with the selected positional trace is determined using the recorded travel time for the selected positional trace; the method further comprising: providing the data set generated from the selected positional trace as part of a set of training data for one or more machine learning algorithm; and training the one or more machine learning algorithm using the set of training data to generate the model.

However, in preferred embodiments, the (bias) model does receive the traffic data as an explicit input parameter and is trained accordingly, e.g. as in the first aspect described above. For instance, it will be appreciated that the bias values may also generally depend on the traffic conditions. This also applies to data indicative of the weather conditions, and this is preferably treated in the same manner as the data indicative of the traffic conditions.

It will be appreciated that the method according to the second, and further, aspects of the present invention described above may generally (and in embodiments do) comprise any of the preferred and optional features of the method according to the first aspect, described above.

In other embodiments, rather than generating a bias value that is used to correct an estimated travel time that has been generated in another, e.g., more traditional fashion, the model may be used to directly predict the estimated travel time for a given route from a set of input parameters characterising the route. In that case, the corresponding model output value for a selected positional trace, characterised in terms of its set of input parameters, may be the recorded travel time for the selected positional trace. Thus, in embodiments, the output value produced by the model is directly indicative of the estimated travel time for the route. The model may thus process the route data for a given route, together with the traffic data, and optionally weather data, to predict the estimated travel time for the route. In that case, the data sets may include, for each selected positional trace, defined in terms of its associated set of characteristic data values, the actual recorded travel time for the selected positional trace. The model can then be trained to provide accurate predictions of the estimated travel time for a given set of characteristic data values. The model that is generated/used according to any of the aspects above may therefore comprise a bias model, or a model that more directly predicts the estimated travel time for a given route from a set of input parameters characterising the route.

Various other arrangements would also be possible in this respect. In general, in embodiments, any suitable model can be used that gives an output that can be used in some way when determining the estimated travel time. Thus, the model may generally be configured and trained to be able to provide any suitable output that can and may desirably be used when determining estimated travel times.

The historic positional traces may be stored in the data store in a map-matched form. However, historic positional data is often stored in a raw format, without reference to a map. Thus, in embodiments, the method may comprise processing each of the selected positional traces to match the selected positional trace(s) onto a respective set of nodes and segments in the electronic map representation of the navigable network. Such map-matching techniques are generally understood in the art and can be performed in a number of ways. Once the positional data has been suitably matched onto the electronic map, the map-matched data can then be further processed to obtain the set of model input values, e.g., from the data in the electronic map for the segments of the map onto which the positional trace has been mapped, as well as the traffic data associated with those segments. To further facilitate the use of such models in the present invention, rather than, e.g., training the model using historic positional data in its 'raw' format, the historic positional traces are preferably pre-processed to extract a reduced set of data values characterising the path associated with the positional trace. It is these characteristic data values that are then used as the input parameters for generating the model, with the model then being trained to generate a corresponding desired output for a given set of characteristic data values (which for the purposes of training the model the corresponding desired outputs may, e.g., comprise a recorded travel time, or a bias value representing a difference between a recorded travel time and an estimated travel time, etc., which may also be determined from the historic positional trace). (Correspondingly, this means that when the model is being used to predict an estimated travel time for a given route, the route data is also pre-processed in a similar fashion to extract a set of characteristic data values for the route in the appropriate format for input to the model. The model is then operable to determine a corresponding output value for a set of characteristic data values for the route, which output can then be used when determining the estimated travel time.)

Thus, the method preferably further comprises processing the selected positional traces to determine for each of the selected positional traces a set of characteristic data values, the set of characteristic data values for each selected positional trace preferably including any one or more of, in any combination: a data value indicative of the first time period, a data value indicative of a location associated with the selected positional trace, as well as one or more "route feature" values characterising the selected positional trace in terms of one or more of: (i) a length of the respective path associated with the selected positional trace; (ii) a (dominant) class or condition associated with the navigable elements along the path associated with the selected positional trace; (iii) a number of turns along the path associated with the selected positional trace; (iv) a number of junctions along the path associated with the selected positional trace; or (v) a number of traffic lights along the path associated with the selected positional trace. It will be appreciated that these are merely some examples of possible route feature values and that the characteristic data values may be any suitable features that are desired to be used for training purposes, e.g., that may impact the estimated travel times. For instance, this may include any combination of the data values mentioned above, as well as any other suitable data values not mentioned above. The route feature values may, e.g., be determined by processing the selected positional trace using the electronic map representation of the navigable network to determine corresponding feature values for individual navigable elements along the path associated with the selected positional trace and processing the feature values for the individual navigable elements to determine an overall feature value for the route. Or, the route feature values may be stored in the data store of historic probe data together with the associated historic positional traces.

In this way, by pre-processing the historic positional traces (and route data) to extract these characteristic data values for input to the model, the amount of data that needs to be processed for training (and using) the model can be reduced, thereby improving processing speed, and without adversely impacting the accuracy of the model. However, such pre-processing of the data may not be necessary. For example, in some unsupervised machine learning techniques, the step of training the model itself extracts the feature pairs that are to be used when training the model (and hence that are subsequently to be used as input parameters when using the model to determine an estimated travel time for a route). In that case, the trace (and route) data may be input to the model in, e.g., its raw format, although preferably the trace data is still map-matched (if it is not stored in a map-matched format). A further aspect of this is that, as well as determining the estimated travel times, e.g. in accordance with the third aspect of the present invention described below, the model output can also be used to identify which features contribute to errors in the estimated travel times. That is, the model may also be used to provide insight into the features that are most relevant for an accurate travel time estimation. For example, the models are derived from historic data which makes it difficult for human experts to understand the key factors that contribute to an accurate travel time estimation. However, such patterns can easily fall out of machine learning techniques. Thus, in embodiments, the model is used for a feature analysis. The feature analysis gives information about which features play an important role in improving the performance of the model, and in what way they are contributing. A visualisation step may then be performed that uses the results of the feature importance step and displays them to users for example in a dashboard, or in a business intelligence report. This helps human decision making both for navigation purposes and for creating or adapting a road network infrastructure.

As mentioned above, the models in the present invention according to any of its aspects are preferably re-trained over time. Thus, in embodiments of the second and further aspects of the present invention, as in the first aspect, the method preferably comprises updating and re-training the model over time as and when new positional data is added to the data store of historic positional data, preferably by updating the set of training data to include respective data sets generated from the new positional traces and re-training the model with the updated set of training data. This may be done periodically. For instance, may be done every 24 hours. Or, the model may be re-trained in response to detecting that the conditions in the network have changed. For instance, an advantage of the use of a machine learning model is that provides an automated way for improving the accuracy of the travel time estimation. Changes in the navigation system (e.g. map information updates) or in the traffic behaviour may result in reduced accuracy of the travel time information. This can be resolved by generating a new model and distributing the model to the navigation system components that use the model.

Preferably the model is also regularly tested using historic positional traces, e.g. to compare the estimated travel times obtained using the model with the recorded travel times, to thereby give an error associated with using the model. When this error exceeds a certain threshold, this may trigger re-training the model, e.g. with an updated training set. Thus, preferably, a pattern-breaking detection step is performed for monitoring the accuracy of the model. As new positional traces are obtained these can be used to evaluate the performance of the model. When it is determined that the performance of the model falls below a certain threshold, a pattern-breaking event is considered happening.

The pattern-breaking detection step is preferably performed as described above in relation to the first aspect. According to any of the aspects of the present invention, the pattern-breaking detection step may also involve considering other possible pattern-breaking events, and is not limited to only evaluating the performance of the model in the manner described above. For example, another indicator of a pattern-breaking event might be that the relative importance of features in the trained model has changed. For instance, if the relative importance of one or more features is significantly different between two versions of the model, this is likely to indicate that there has been a change to the underlying navigable network, that may therefore need to be investigated further, e.g. even if the model is apparently still performing with sufficient accuracy. Thus, in embodiments, the pattern-breaking detection step further comprises performing a feature analysis to determine whether there is a change in feature importance between two versions (the previous and current versions) of a model. Such feature analysis can be performed in any suitable and desired manner, and is known as such in the art.

Preferably a model update/re-train step uses the pattern breaking result to update or to completely re-train the model. If no pattern-breaking detected/reported, the model is preferably automatically updated every day. For instance, any new positional trace are added into the training set, and used to re-train the model. The new model can then be used to evaluate the oldest traces in the training set. If the performance drops below a threshold, the oldest data may be outdated (or the model doesn't have enough capacity to capture the oldest data), and these traces can be and preferably are removed from the training set. If new deployment of traffic model or speed profile is reported, all training set is automatically re-processed by the historical routing framework, and the model is re-trained with the new training set. If pattern-breaking is automatically detected, after the routinely model update, use the new model to evaluate the new traces again. If pattern-breaking is still observed, alert emails are sent out for human-involved investigation.

Thus, in general, according to embodiments of the present invention, after a first version of the model has been generated, using a first set of training data generated from a first group of positional traces, the method comprises generating an updated version of the model by selecting another positional trace (or group of positional traces), processing these in the manner described above to generate respective data set(s), and then adding the generated data set(s) into the set of training data, to generate a second set of training data, that is then used to re-train the model to generate a second version of the model. In other words, the process of generating the model may, and in embodiments does, comprise a process of updating a version of a model.

The first, second and further aspects described above relating to the generating/updating are preferably performed on a server. In that case the trained (updated) model is preferably then distributed to a navigation device associated with a user/vehicle, e.g. as part of a software update, for use by a routing module local to the navigation device. The same model may be distributed to all navigation devices that are using the server. Or, a number of different models may be generated, that are segmented according to, e.g., vehicle class, or any other suitable classification, and distributed to devices associated with that class (only). In that way, the estimated travel time predictions may be based on expected travel times for users in a similar class. The model can thus be periodically re-trained and the updated model then provided to navigation devices appropriately. This then allows the model to be centrally updated and all users to benefit from the updated model.

In other examples the routing module may itself also be provided at the server, e.g. as part of an online or cloud-based API. In that case, a navigation device can issues requests to the server for the routing module to generate a route, and then return to the navigation device the route together with the estimated travel time for that route. In that case, it can be ensured that the navigation device is always the most up-to-date version of the model, as this is maintained at the server, without having to wait for the navigation device itself to be updated.

It would also be possible that the generation of the model could be performed on the navigation devices, rather than at a server, although this may generally be less preferred due to processing requirements, and the typically limited processing resource available at the navigation devices. This could either be done on a single navigation device to generate a dedicated model for use by that device. Or, the model generation may involve federated machine learning where the training of the model is executed and implemented across multiple devices.

It will be appreciated that the use of such a trained model when determining an estimated travel time in the manner described herein may therefore provide various improvements compared to other approaches for determining estimated travel times.

The present invention also extends to methods for using such models to determine estimated travel times.

In accordance with a third aspect of the present invention there is provided method, preferably being at least partially implemented by a computer, for determining an estimated travel time for a route extending through a navigable network from a start location in the navigable network to an end location in the navigable network, the navigable network being represented by an electronic map, the method comprising:

- obtaining a set of route data for the route, the route data identifying by reference to the electronic map representation of the navigable network a sequence of one or more navigable elements of the navigable network defining the route, and wherein the route is associated with a departure time;
- processing a set of model input values determined from the set of route data for the route using a model that has been trained to generate from the set of model input values a corresponding output value useable in determining an estimated travel time for the route; and
- determining using the output value produced by the model for the route an estimated travel time for the route.

Preferably the method according to the third aspect further comprises a step of obtaining traffic data indicative of traffic conditions in the navigable network; and the method preferably in that cases comprises processing a set of model input values determined from the set of route data for the route and the obtained traffic data using a model that has been trained to generate from the set of model input values a corresponding output value useable in determining an estimated travel time for the route.

Thus, the method of the third aspect relates to a method for determining an estimated travel time for a given route using a model, e.g., generated substantially as described above. The model may thus comprise any model that has been suitably trained to produce an output that can be used in determining an estimated travel time for a route based on a set of suitable input parameters characterising the route (which output may, e.g., comprise a bias value, or a prediction of the estimated travel time, or any other suitable output, as discussed above).

The method accordingly involves an initial step of obtaining a set of route data for the route in question. It will be appreciated that the route is typically a route that has been generated by a route planning algorithm of a navigation system. The route may thus be, and preferably is, a route that has been determined using an appropriate cost function, by exploring possible routes through the network between the start and end locations and selecting the route or routes having the lowest associated cost, e.g. in the usual fashion, with the cost values being determined from the data in the electronic map representation, as well as live traffic data. Such route generating functionality is generally known in the art. The obtained route data may thus correspond to a previously determined route, which may, e.g. be a route that a device is currently being navigated along (although this need not be the case, and the method may also be performed offline). The step of obtaining the route data may however also comprise the step of generating the route, e.g. which may be performed by a suitable route planning module of a navigation system.

The route data defining the route is provided with reference to an electronic map representation of the navigable network. Thus, the navigable elements defining the route are identified with reference to the corresponding map segments and nodes in the electronic map. The route data may be obtained in a map-matched form, and this is normally the case since the route generation is typically performed by exploring the electronic map. However, the method may comprise an explicit step of map-matching (similarly as described above for the positional traces). This may be the case, for example, when the route data has been generated by a different navigation system, potentially using a different map representation (or different map version), and it is desired to map the route data onto a different map representation.

The route data for a given route generally comprises data indicative of the departure time for the route (which may, e.g., be the current time, when the method is being used in a live navigation system to determine the estimated travel time for the route along which a user is currently being navigated, although this need not be the case), as well as data indicative of the start and end locations for the route. The route data also identifies a sequence of navigable elements, or more precisely of map segments, defining the path associated with the route.

In order to convert the route data, however it has been obtained, into a format suitable for input to the model, the route data is preferably, but not necessarily, then pre-processed, e.g. as described above, to extract a set of characteristic data values for the route. It will be understood that the characteristic data values that should be (and therefore are) determined for a given route will depend on the model being used. That is, it will be understood that the model has been generated to provide a desired output based on a given set of input parameters representing a set of characteristic data values for a route (which characteristic set of data values are those used when training the model). Thus, the route should preferably be processed to extract characteristic data values corresponding to each of the input parameters for the model. In some embodiments, rather than explicitly pre-processing the route data to extract such characteristic data values, the feature extraction is performed by the model itself. In that case, the route data, as well as any traffic and/or weather data, may be provided to the model in its, e.g., raw format.

The model may generally take into account any suitable route features for which data values can be extracted, e.g. depending on the desired output. The selection of the input parameters, i.e. which characteristic features are to be used for the model, may also be a parameter to be explored, as the model may provide insight into which route features are most significant for determining the expected travel times (which may not be immediately apparent or intuitive, but which patterns can readily be identified through the training of the model).

In the present invention, the characteristic data values for the route generally include at least a data value indicative of a time period associated with the route and a data value indicative of a location associated with the route. For instance, as mentioned above, the route will be associated with a particular departure time, which is preferably obtained together with the route data. It will be appreciated that traffic conditions and user behaviour within a given navigable network are highly dynamic phenomena. Thus, the conditions in the navigable network, and hence the expected travel times, will typically vary over time. There may therefore be various patterns associated with the temporal variation in the expected travel times. For instance, the expected travel times may be expected to be significantly longer during week days at rush hour, than at other times. Other patterns may also exist, which may be difficult for a human to determine. However, the model may be suitable training be able to identify such patterns of behaviour, and adapt the expected travel times accordingly. Thus, the model preferably takes into account a time period associated with the route (and therefore the model is preferably trained using corresponding time periods associated with the historic positional traces). The method thus comprises extracting from the route data values indicative of such time periods. Preferably the extracted data values are indicative of at least one of a time of day (e.g. rush hour) and a day of the week (e.g. weekend vs weekday) associated with the time period. A suitable data value may also be extracted indicating whether or not the time period corresponds to a known national holiday. In order to process the route data using the model, a set of data indicative of a time period associated with the route is extracted, and input to the model, which then takes this into account when generating the output. These data values may be determined from the departure time by suitably binning/classifying the departure time. This may be performed during the feature extraction. Or, this may be performed in a prior step, and the route data may already include data values associated with the desired time periods.

The model preferably also takes into account a location associated with the route. Again, it will be appreciated that the dynamic nature of the conditions in the navigable network mean that the expected travel times may be affected by conditions not just along the navigable elements defining the route, but also those within a wider area around the route. Thus, the location associated with the route may be a predetermined area, or set of areas into which the navigable network has been divided, including the route. The data value indication of the location is thus also provided to the model which takes this into account when generating its output.

In addition to the data values indicative of the time period and location associated with the route, the route is preferably also characterised in terms of one or more "route feature"

values characterising the route in terms of one or more of: (i) a length of the route; (ii) a dominant class or condition of navigable element associated with the navigable elements along the route; (iii) a number of turns along the route; (iv) a number of junctions along the route; or (v) a number of traffic lights along the route. These route feature values have been found to affect the accuracy of the estimated travel times and can therefore be used to provide useful models. Preferably, the model is trained to take all of these into account, and data values indicative of each of these route features are extracted for the route. However, in general, the model may be trained to take any set or subset of these in account (in which case only data values indicative of that set or subset need to be extracted for the route). In fact, it will be appreciated that these route features are only some examples of possible input parameters and the model may in general be generated for any suitable set of input parameters, not limited to those mentioned above.

These route feature values can generally be determined from the electronic map data. In particular, the route feature values may be determined from the sequence of one or more navigable elements defining the route by determining from the electronic map representation of the navigable network corresponding feature values for individual navigable elements along the route and processing the feature values for the individual navigable elements to determine an overall feature value for the route. For example, the length of the route can readily be extracted from the electronic map data. The electronic map will also typically include information regarding the class or condition of the navigable elements (e.g. a road class such as motorway, etc.) along the route, as well as the positions of junctions, traffic lights, etc., in the navigable network.

The determination of the estimated travel time should, and preferably does, also take into account, e.g., live traffic and/or weather conditions within the navigable network that are relevant to the route. The relevant live conditions may be those for the time period associated with the route and within the vicinity of the route. In some preferred embodiments, 'live' traffic and/or weather data may be obtained along with the route data, and processed to determine corresponding data values characterising the current traffic and/or weather conditions that are also then provided as input to the model (in which case the model should also be trained using such data values). However, this need not be the case, and the traffic and/or weather data may be taken into account in various ways, depending on the form of the model, and its output.

It will be appreciated that the route is preferably characterised in terms of 'route level' features, e.g. rather than data representing the individual elements of the route. These features thus together define a characteristic set of data values for the route that correspond to the input parameters used to generate the model. The characteristic set of data values for the route can then be input to the model and used thereby to determine the desired output. Thus, once a suitable characteristic set of features for a route has been determined, the characteristic set of features for the route is provided as input to the model, which then generates a respective model output.

The model output is then used to determine the estimated travel time. This may be achieved in various ways, depending on the form of the model, as explained above. For instance, in an embodiment, the method is performed in respect of a navigation system including a routing module, and wherein the output value produced by the model is a bias value for adjusting an initial estimated travel time previously determined by the routing module of the navigation system, the step of determining using the output value produced by the model for the route an estimated travel time for the route comprising: adjusting the initial estimated travel time for the route determined by the routing module of the navigation system using the output value produced by the model for the route to determine an adjusted estimated travel time for the route; and providing the adjusted estimated travel time for output. In that case, as explained above, the output value produced by the model is a bias value associated with the input set of characteristic data values, and the model is a model that has been trained using a set of biases, or error, values representing the differences between the recorded travel times and estimated travel times for the historic positional traces. In another embodiment, the output value produced by the model is directly indicative of the estimated travel time for the route. In that case, as described above, the model may be trained using the actual recorded travel times for the historic positional traces, preferably as well as any live traffic and/or weather conditions, such that the training set includes a plurality of data sets that include a set of data values characterising the historic positional traces, including historic traffic conditions, and a desired output in the form of the corresponding recorded travel time for the historic positional trace. Various other arrangements would of course be possible and any suitable model can be used that gives an output that can be used in some way when determining the estimated travel time.

Once the estimated travel time has been determined, the estimated travel time is preferably then provided for output, e.g. for display to a user. For instance, the method of the third aspect is preferably performed in respect of (and preferably by) a navigation system associated with a user that is currently being navigated along the route in question. For instance, the method is preferably performed in respect of a navigation client, and the method further comprises providing the determined estimated travel time for output to a user of a navigation system executing the navigation client. Preferably the estimated travel time is displayed to the user. The method therefore preferably comprises a step of providing the determined estimated travel time for output, which preferably involves displaying the determined estimated travel time to a user. This is preferably done using an associated display of a navigation system (which may be a dedicated display for the navigation system, or may, e.g., be a display of a user's smartphone or other such device). However, other suitable outputs may also be generated, including audible outputs, etc.

The present invention also extends to systems for performing the steps of the method in accordance with any of the aspects of the invention described above.

In accordance with a further aspect of the present invention there is provided a system for updating a model to be used by a routing module of a navigation system, the routing module being operable to determine an estimated travel time for a route extending through a navigable network from a start location in the navigable network to an end location in the navigable network, the navigable network being represented by an electronic map comprising a plurality of nodes connected by segments representing navigable elements of the navigable network, wherein the routing module determines an estimated travel time for a given route by:

obtaining a set of route data for the route, the route data identifying by reference to the electronic map representation of the navigable network a sequence of one or more navigable elements of the navigable network defining the route;

obtaining traffic data indicative of traffic conditions in the navigable network;

processing a set of model input values determined from the set of route data for the route and the obtained traffic data using a model that has been trained to generate from the set of model input values a corresponding output value useable when determining an estimated travel time for the route; and using the output value produced by the model for the route when determining the estimated travel time for the route;

the system comprising:

a model updating circuit configured to:

obtain a set of new positional data that has been obtained from devices travelling within an area of the navigable network represented by the electronic map, the set of new positional data including one or more positional trace(s) representing respective trips taken within the navigable network, each positional trace comprising a sequence of positional data corresponding to the movement of a device along a respective path extending through the area of the navigable network from a start position to an end position in the area of the navigable network, each positional trace having an associated time period reflective of when the positional trace was recorded and each positional trace also having an associated recorded travel time corresponding to the time taken for the device to travel from the start position to the end position along the respective path for the selected positional trace;

add one or more positional trace(s) from the set of new positional data into a data store of historic positional data, and using the data in the data store of historic positional data including the new positional trace(s) to provide a set of training data for training one or more machine learning algorithm for generating the model, wherein the training data comprises a plurality of respective data sets derived using respective, selected positional traces from within the data store of historic positional data, each data set in the set of training data comprising: a set of model input values characterising the selected positional trace and the traffic conditions in the area of the navigable network during the time period associated with the selected positional trace; and a corresponding model output value for the set of model input values, wherein the model output value is determined using the recorded travel time for the selected positional trace; and generate a new version of the model by training one or more machine learning algorithm based on the respective sets of model input and corresponding model output values for the data sets included in the set of training data;

the system further comprising:

a model evaluating circuit configured to:

select one or more positional trace(s) from within the set of new positional data for evaluating the performance of the current version of the model;

evaluate the performance of the current version of the model by comparing an estimated travel time determined by a routing module using the model with the recorded travel time for the positional trace(s) that were selected for evaluating the performance of the model; and in response to the evaluation of the performance of the current version of the model:

when it is determined based on the comparison of the estimated travel time determined using the model with the recorded travel time for the positional trace(s) that were selected for evaluating the performance of the model that the performance of the current version of the model is less than a threshold performance value, determine that a change in conditions associated with the navigable network (a 'pattern-breaking event') has occurred, and output an indication of this.

In accordance with a yet further aspect of the present invention there is provided a system for generating a model for use in determining an estimated travel time for a route extending through a navigable network, the navigable network being represented by an electronic map, the system comprising one or more processor(s) configured to:

select a positional trace from a data store of historic positional data that has been obtained from devices travelling within an area of the navigable network represented by the electronic map, the selected positional trace comprising a sequence of positional data corresponding to the movement of a device along a path extending through the area of the navigable network from a start position to an end position in the area of the navigable network;

obtain a recorded travel time for the selected positional trace, the recorded travel time corresponding to the time taken for the device to travel from the start position to the end position along the respective path for the selected positional trace can be determined;

obtain a set of historic traffic data indicative of traffic conditions in the area of the navigable network during a first time period associated with the selected positional trace;

generate from the selected positional trace a respective data set comprising:

a set of model input values characterising the selected positional trace and the traffic conditions in the area of the navigable network during the first time period associated with the selected positional trace; and a corresponding (desired) model output value for the set of model input values, wherein the corresponding (desired) model output for the set of model input values is determined using the recorded travel time for the selected positional trace;

include the respective data set generated from the selected positional trace into a set of training data for generating the model, the set of training data comprising a plurality of data sets each including a respective set of model input values and a corresponding model output value; and generate the model by training the one or more machine learning algorithm based on the respective sets of model input and corresponding model output values for the data sets included in the set of training data.

In accordance with yet another aspect of the present invention there is provided a system for determining an estimated travel time for a route extending through a navigable network from a start location in the navigable network to an end location in the navigable network, the navigable network being represented by an electronic map, the system comprising one or more processor(s) configured to:

obtain a set of route data for the route, the route data identifying by reference to the electronic map representation of the navigable network a sequence of one or more navigable elements of the navigable network defining the route, and wherein the route is associated with a departure time;

process a set of model input values determined from the set of route data for the route using a model that has been trained to generate from the set of model input values a corresponding output value useable in determining an estimated travel time for the route; and determine using the output value produced by the model for the route an estimated travel time for the route.

The systems in these aspects of the invention may include any or all of the features described in relation to the other aspects of the invention, and vice versa, to the extent that they are not mutually inconsistent. Thus, even if not explicitly stated herein, the systems of the present invention may comprise means, or a set of one or more processors, or circuitry for carrying out any of the steps of the method or invention as described herein.

In preferred embodiments the system of any of these further aspects of the invention comprises one or more server. The method may be performed by a server operating on suitable sources of traffic data and vehicle positional data e.g. filtering to obtain data for the applicable time. However, other arrangements are envisaged, and the steps may be implemented by a distributed system, which may include one or more server and/or one or more computing device of any type e.g. a navigation device.

The various functions described herein can be carried out in any desired and suitable manner. For example, the present invention can generally be implemented in hardware or software, as desired. Thus, for example, unless otherwise indicated, the various functional elements, modules interfaces, stages, units, and "means" of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

The means (processing circuit/circuitry) for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the selected positional trace(s) and/or evaluation data. The system may further comprise display means, such as a computer display, for displaying, for example, the evaluation data and/or performance indicator data derived therefrom.

The methods described herein are at least partially implemented on a computer, and are thus computer implemented methods. The methods of the present invention are, in preferred embodiments, implemented by a server. Thus, in embodiments, the system of the present invention comprises a server comprising means (processing circuitry) for carrying out the various steps described, and the method steps described herein are carried out by a server.

The navigable network may comprise a road network, wherein each navigable element represents a road or a portion of a road. For example, a navigable element can represent a road between two adjacent intersections of the road network, or a navigable element may represent a portion of a road between two adjacent intersections of the road network. As will be appreciated, however, the navigable network is not limited to a road network, and may comprise, for example, a network of foot paths, cycle paths, rivers, etc. It should be noted that the term "segment" as used herein takes its usual meaning in the art. A segment of an electronic map is a navigable link that connects two points or nodes. While embodiments of the present invention are described with particular reference to road segments, it should be realised that the invention may also be applicable to other navigable segments, such as segments of a path, river, canal, cycle path, tow path, railway line, or the like. Thus, any reference to a "road segment" may be replaced by a reference to a "navigable segment" or any specific type or types of such segments.

The network is represented by electronic map data. The electronic map data may be stored by or otherwise accessible by the server, in embodiments in which the method is implemented using a server. The electronic map (or mathematical graph, as it is sometimes known), in its simplest form, is effectively a database containing data representative of nodes, most commonly representative of road intersections, and lines between those nodes representing the roads between those intersections. In more detailed electronic maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit.

In practically all modern electronic maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

The electronic map data in the present invention thus generally comprises a set of data indicative of the geometry of the navigable network, together with a set of attribute data associated with the individual navigable elements thereof. The electronic map data can then be used, in a generally known fashion, for route planning and/or navigation purposes. In particular, in embodiments of the present invention, the attribute data is used when determining cost values for routes through the network, as is described elsewhere herein.

It will be appreciated that the methods in accordance with the present invention may be implemented at least partially using software. It will thus be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the system or apparatus, it will be appreciated that any one or more or all of these operations may be performed in the method and by the system or apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying drawings, in which.

DETAILED DESCRIPTION

A system which may be used to facilitate understanding of the context of the present invention will now be described by reference to FIGS. 1-5. Embodiments will now be described with particular reference to a Portable Navigation Device (PND). It should be remembered, however, that the teachings of the present invention are not limited to PNDs but are instead universally applicable to devices able to transmit positional data samples to a server, including, but not limited to, any type of processing device that is configured to execute navigation software in a portable manner so as to provide route planning and navigation functionality. Some exemplary such devices are described below by reference to FIGS. 6 and 7. It follows therefore that in the context of the present application, a navigation device is intended to include (without limitation) any type of route planning and navigation device, irrespective of whether that device is embodied as a PND, and includes a device integrated into a vehicle such as an automobile, or indeed a portable computing resource, for example a portable personal computer (PC), a mobile telephone or a Personal Digital Assistant (PDA) executing route planning and navigation software. The present invention is also applicable to devices which may transmit positional data samples which may not necessarily be configured to execute navigation software, but which transmit positional data samples and are arranged to implement the other functionality described herein.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that where route planning is performed, this may occur even in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
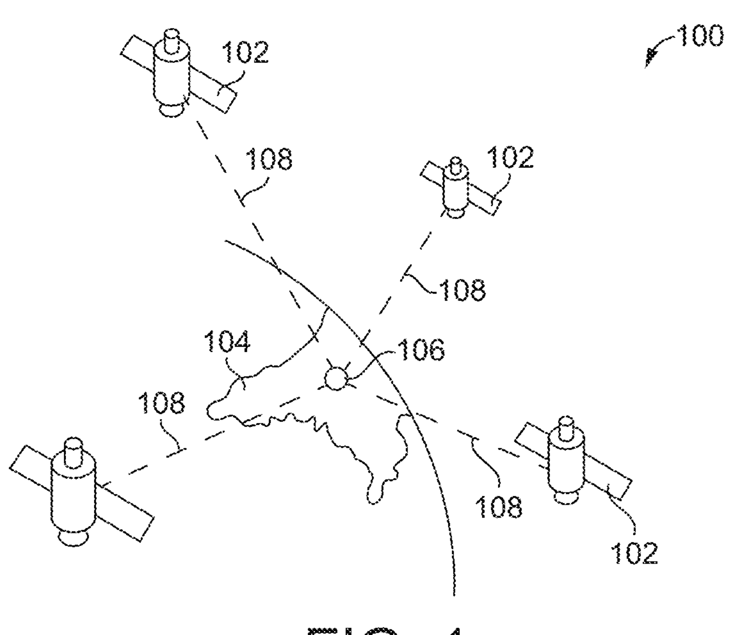
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
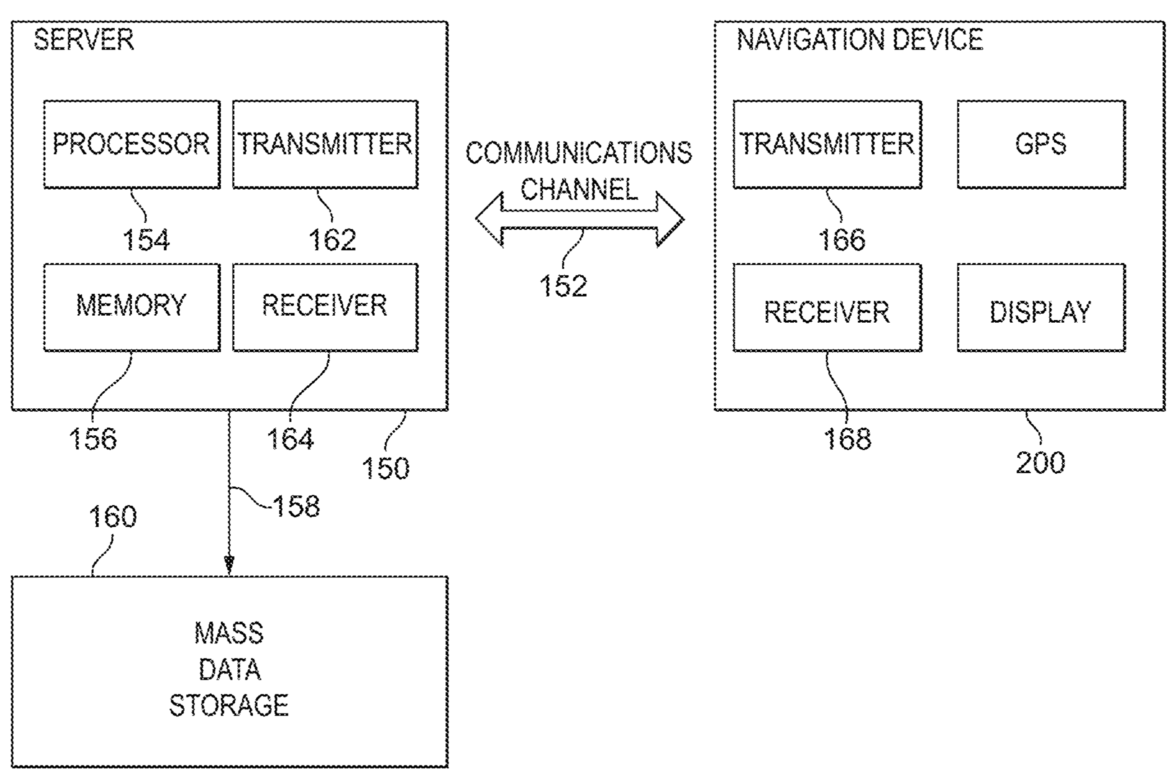
FIG. 2 is a schematic diagram of a communications system for communication between a navigation device and a server.

Turning to FIG. 2, a navigation device 200 (e.g. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
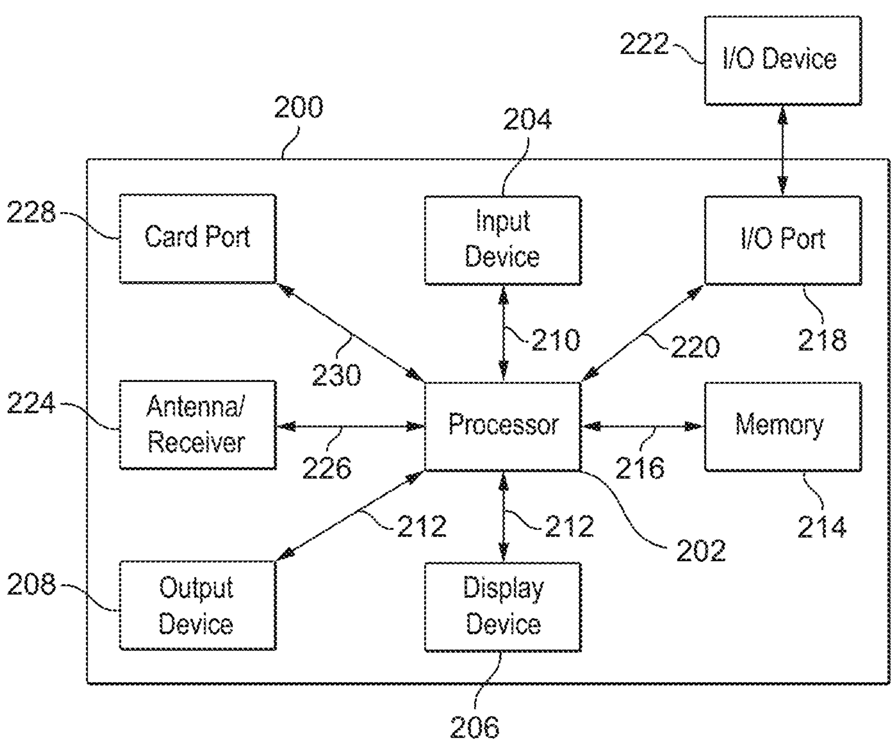
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or “soft” buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or an input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
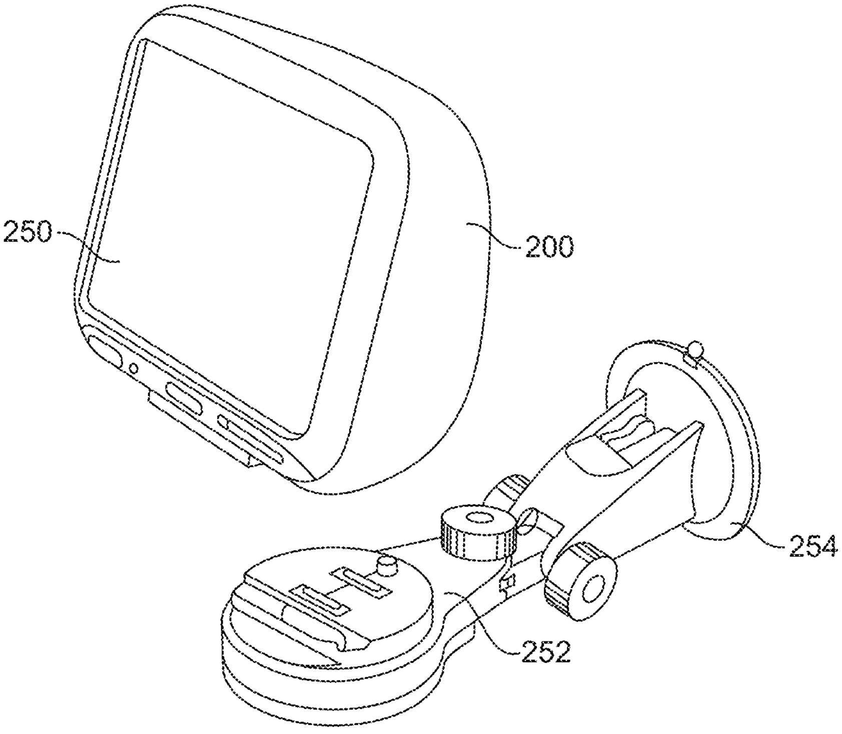
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard, window or the like using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Of course, the navigation device need not be provided by a PND type device as illustrated. A wide range of general computing devices may, when running a navigation client, as described below, provide the functionality described by reference to the navigation device 200, and may communicate with a server in the same manner.

Figure 5:
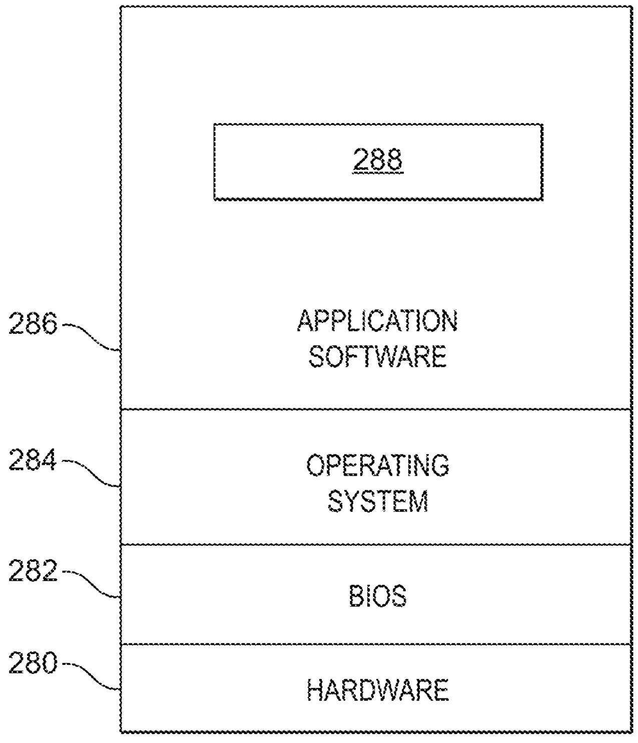
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, when triggered in accordance with the methods described herein, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, and a time stamp. Such data is referred to herein as a positional data sample.

Further, the processor 202 is arranged to upload each positional data sample (i.e. the GPS data and the time stamp) to the server 150. The navigation device 200 may have a permanent, or at least generally present, communication channel 152 connecting it to the server 150.

In the embodiment being described, the positional data samples provide one or more trace, with each trace representing the movement of that navigation device 200 within an applicable period e.g. while traversing a given path. The server 150 is arranged to receive the received positional data samples and to store these as a record of the whereabouts of the device within the mass data storage 160 for processing. Thus, as time passes the mass data storage 160 accumulates a plurality of records of the whereabouts of navigation devices 200 which have uploaded positional data samples. The server may restructure positional data samples forming a trace e.g. by associating a common element, such as the device identifier value or the period to which the data relates, to the trace as a whole, rather than to each of the positional data samples that make up the trace. After moving common elements to the trace level, the individual positional data samples in the trace may at least contain the location values and a time offset within the period to which the trace relates (e.g. a time since start of a period or a sequence number).

As discussed above, the mass data storage 160 also contains map data. Such map data provides information about the location of road segments, points of interest and other such information that is generally found on map.

As mentioned above, the term "navigation device" as used herein should be understood to encompass any form of device running an appropriate navigation client, and is not limited to the use of a specific use PND type device as illustrated in FIG. 4. A navigation client is a software application that runs on a computer device. Navigation devices may be implemented using a wide range of computing devices. Some exemplary such devices are shown in FIG. 6.

Figure 6:
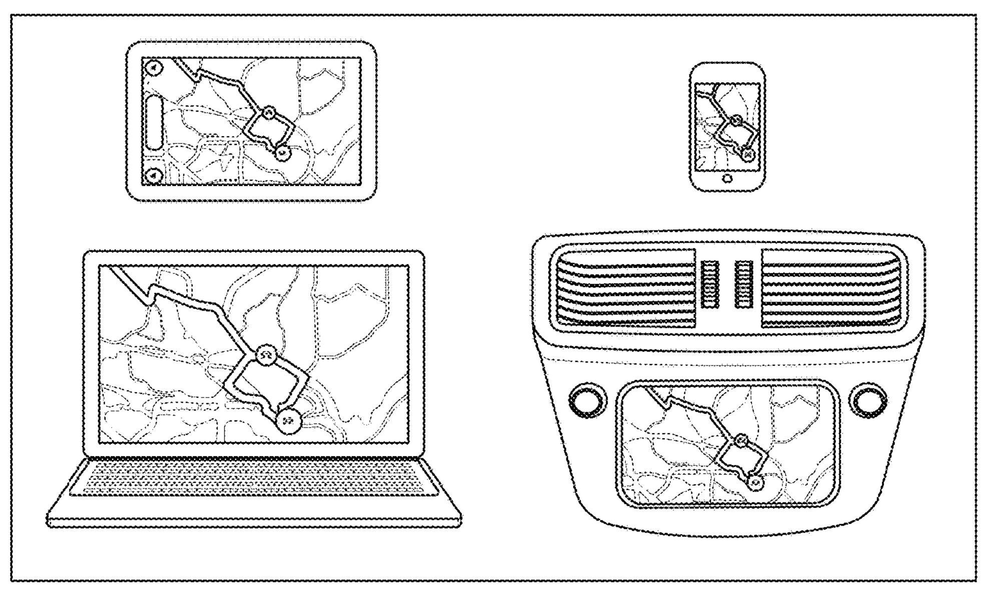
FIG. 6 illustrates various forms that a navigation device may take.

The devices in FIG. 6 all include a navigation screen for assisting a user to navigate to a desired destination. These include a personal navigation device (PND), which is a single purpose computing device (upper left), a general purpose computing device in the form of a mobile phone (top right), a laptop (bottom left) and an in-vehicle integrated computing device (bottom right). Of course, these are merely some examples of a wide range of general computing devices which may be used to run a navigation client. For example, tablets or wearable devices, such as watches may be used.

Figure 7:
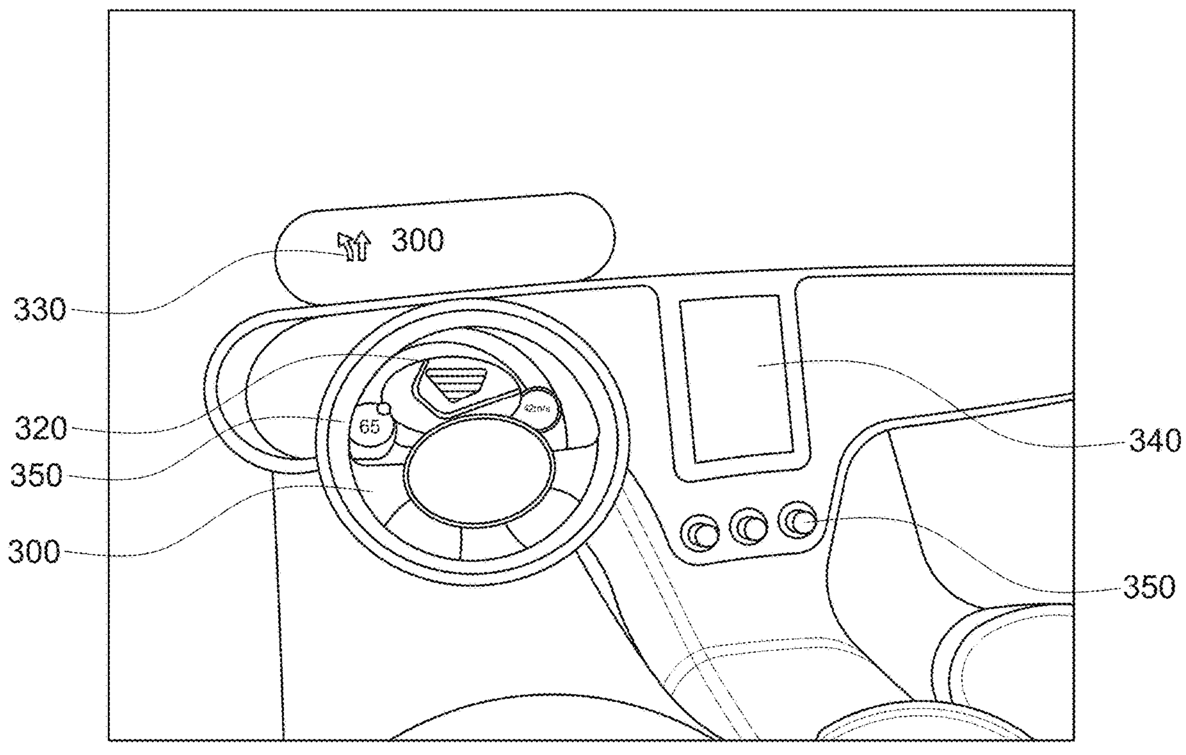
FIG. 7 illustrates various devices which may be associated with a vehicle.

A vehicle may have multiple computing devices and multiple displays in support of the driver as shown in FIG. 7. FIG. 7 shows the interior of a car with a steering wheel 300, a first display area 320 behind the steering wheel, a heads-up display 330 projected onto the front window, a centre display 340 and a plurality of controls (buttons, touch screen) 350. In addition, the car may support the adoption of mobile devices into the car computer environment.

Figure 8:
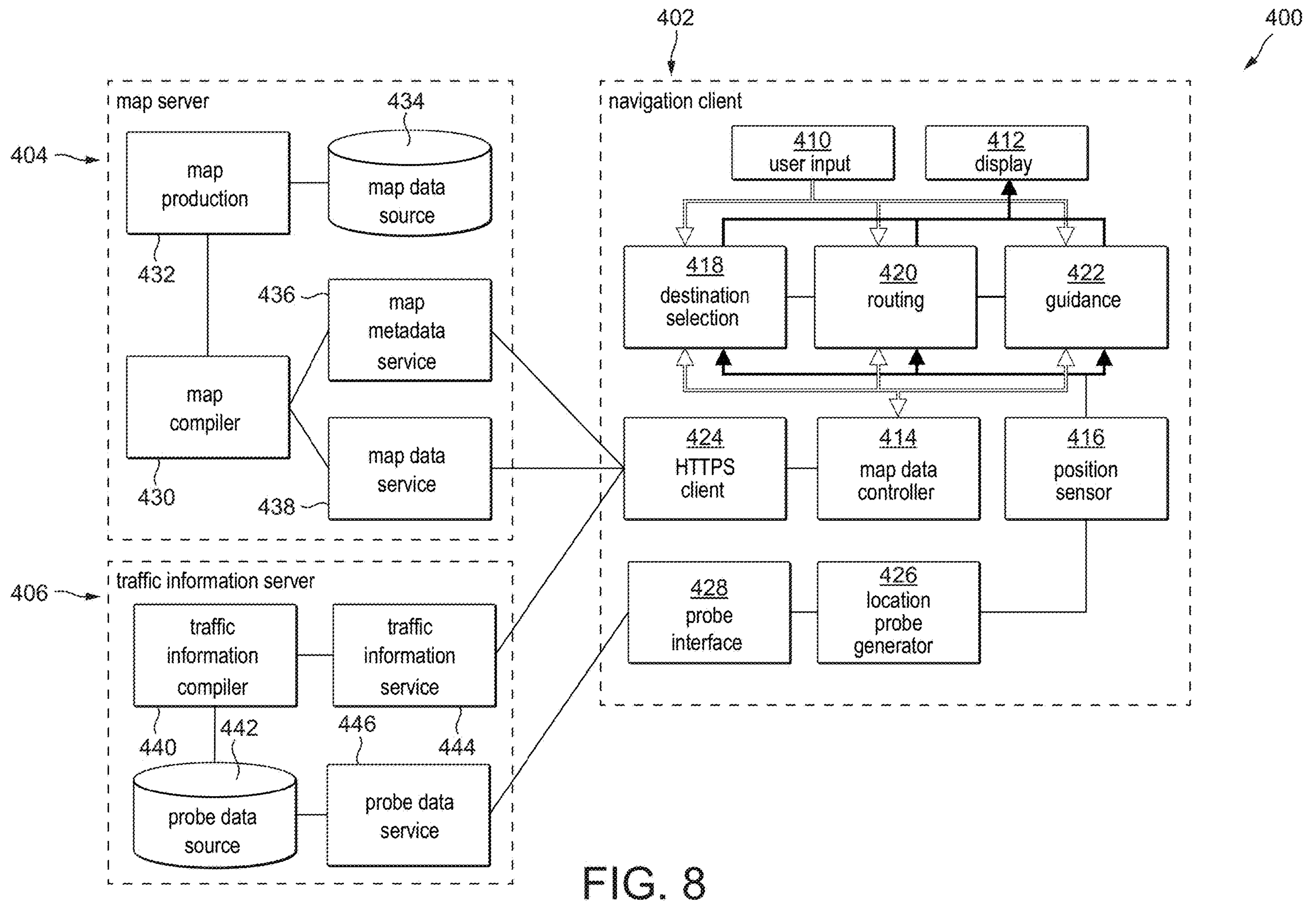
FIG. 8 illustrates another exemplary navigation system.

A functional diagram of another exemplary navigation system 400 is shown in FIG. 8. The system includes a navigation client 402, which may be provided by a software application running on any suitable computing device, as exemplified by reference to FIGS. 6 and 7. The system 400 also includes a map server 404, a traffic information server 406 and an in-vehicle control system 408. These components are described in more detail below. It will be appreciated that the navigation system will include a plurality of navigation clients 402 in communication with the map server 404 and traffic information server 406.

Navigation Client 402

The navigation client is provided by a navigation application running on a computing device. The navigation client 402 provides user input and output devices 410, 412 as common to most computing devices. The navigation client also provides a map data controller 414 that obtains and stores map data in the non-volatile memory of the computing device on which the navigation application providing the client is run. The navigation device on which the navigation application is run also includes a position sensor 416, in addition to conventional computing device components such as a processing unit, a memory, a display, a long term storage (flash memory), a networking interface. Such more conventional components are not shown in FIG. 8, which illustrates those components more relevant to supporting navigation functionality.

The navigation client 400 operates using an electronic map of a geographic area. The map information may be stored locally on the device (e.g. in non-volatile, solid state memory) or may be retrieved from a navigation server. The navigation client uses the electronic map to generate a map view of a geographic area of interest on the display of the computing device. Usually, the geographic area is centered around a current location of the computing device executing the navigation client software application.

The current location is determined using the position sensor 416, which may use any of a broad range of location sensing technologies such as satellite positioning (GPS, GNSS, . . . ), WiFi (wireless triangulation), Mobile phone tracking, BlueTooth beacons, image analysis (examples of which are described in PCT/EP2016/068593, PCT/EP2016/068594, PCT/EP2016/068595, and PCT/IB2016/001198, the entire contents of which are herein incorporated by reference), Map matching, Dead reckoning, and other position sensing techniques. In the presence of position sensing errors map matching may be used to adjust the measured position(s) to best match a road segment on a map.

The navigation client 402 can assist a user with navigating from the current location to a destination location. The destination can be entered using a destination selection module 418. A routing module 420 of the navigation client calculates the route to the selected destination. The routing module 420 also obtains current traffic information in addition to the electronic map to determine an estimated travel time or an estimated time of arrival. The current traffic information describes the current situation on the road network in the geographic area of the electronic map. This includes current average speed, current traffic density, current road closures and so on. The routing module 420 may present a preferred route as well as alternative routes enabling the end-user to select a preferred route.

A guidance module 422 of the navigation client uses the selected preferred route to guide the end-user to the selected destination. It may use the display showing the map and a part of the route to the destination. The guidance also may take the form of additional graphical indications on the display. Most navigation clients also support audio guidance with turn by turn instructions.

Active navigation clients generate location probes and provide these to the traffic information server that uses these probes to calculate and update the traffic information. The navigation client 402 includes a location probe generator 426 and a probe interface 428 for implementing these functions.

The navigation client 402 also includes an HTTPS client for communicating with the map server 404 and traffic information server 424.

Map Server 404

The map server 404 is an infrastructure for storing, managing and creating a large amount information for creating electronic maps and the use of the electronic maps for navigation. The map server may be provides by a cloud server system.

The map server 404 includes a map compiler 430 that receives map data from a suitable map production unit 432. The map production unit 432 receives map source data from map data source 434 and converts this into a suitable format for inclusion in the electronic map. For example, the map compiler 430 may sort map data into respective layers and tiles for an electronic map. The map server 404 further includes a map data service 436 and a map metadata service 436. The combination of map data service 436 and map metadata service 436 may together be referred to as a "cloud service". The HTTPS client 424 may retrieve map metadata from the map metadata service 436, and then, as required, may use the metadata to retrieve the map data from the map data service 438.

A typical navigation server manages map information associated with 107-108 kilometres of road networks for a wide range of countries (around 200 countries). The map information needs to be of high quality, so the server infrastructure processes updates to the map information, with an update rate averaging around 1000 updates per second. In addition the map information needs to be distributed to a global infrastructure of navigation clients. The distribution requires a sophisticated content distribution network in addition to cloud computing systems to generate the map information to be distributed. The navigation server also aggregates, processes and distribute real time traffic information.

Traffic Information Server 406

The traffic information server 406 includes a traffic information compiler 440 which compiles traffic information using data obtained from a positional data source 442. The positional data source 442 receives data from a positional data service 446, which, in turn, is configured to receive positional data from navigation clients. The traffic information compiler 440 provides traffic information to a traffic information service 444, which communicates with the HTTPS client 424 to provide traffic information thereto.

The traffic information server 406 provides road and traffic information to the navigation client 402.

Map information usually contains static traffic information based on historic data. For more dynamic traffic information such as traffic densities, parking availability, accidents, road closures, updated road signs, and points of interest, the traffic information server receives location positional data from navigation clients. The traffic information compiler uses the current location positional data obtained from multiple navigation clients to generate current traffic information.

Location Positional Data

During normal operation the navigation client 402 periodically sends location positional data to the traffic information server 406. The location positional data comprises information about a recent or current location of the navigation client. The location positional data may be combined into a set of positional data elements, usually referred to as a trace. The traffic information server 406 uses the trace or the positional data to estimate current traffic information. This information comprises parameters for road segments such as current average speed and current traffic density. The traffic information server 406 processes the location positional data to provide real time traffic information to the navigation client 402 enabling better route generation and improving estimated travel times to a destination.

The term location probe (or 'probe') refers to a data sample including at least positional information, indicative of a position of the navigation client i.e. the device implementing the client. Typically the position data will include a longitude value and a latitude value (both with a typical accuracy of around 10 meters). The positional data sample may include other data, such as a time value. The time value provides a time associated with the position data, and may be received from the positioning system, so as to correspond to the time at which the position data was generated, or may correspond to the time of transmission of the positional data sample. The positional data sample may also include a device identifier value (uniquely associated with an end-user device and a user).

The term trace describes a set of location probes that are associated with the same device, user, and a common period. The trace data can be restructured at the server e.g. by associating a common element such as the device identifier value or a time period to which the positional data relates to the trace rather that to each of the probes that make up the trace. After moving common elements to the trace level, the individual probes in a trace at least contain the location values and a time offset within the period (e.g. a time since start of a period or a sequence number).

FIG. 8 thus shows an example of a navigation client operating on map information (junction & segment data, and static cost parameters) and on traffic information (current cost parameters). When a user configures a navigation client for guidance to a destination, the destination module provides the desired destination to the routing module and optionally the user travel preferences. The position sensor module provides a current location (the source destination) to the routing module. For determining the route to the destination, the routing module calculates a path that has the lowest cost according to some relevance to the user e.g. using distance, time, arrival certainty.

The parameters for the cost calculation are contained in the map information and the current traffic information. The routing module (engine) may generate different routes with comparable costs from which the user may select a preferred one. A guidance module receives the determined route and some of the characteristic parameters (e.g. estimated travel time, traffic load, congestion delays, scenic rating) and uses the information to present guidance instructions to the user.

The present invention is, in preferred embodiments at least, directed to methods for determining estimated travel times for routes. In particular, this is done using a suitably trained model. The model is preferably generated and trained using a "historic routing framework", as will now be described.

Historic Routing Framework 500

The previous section describes known functionality of a navigation client and the information that it requires for its operation. The inventors of the present application have realised that this information can also be derived from historic trace information, and that such historic probe data thus represents a source of 'ground truth' data for modelling the behaviour of the navigable network. For instance, historic probe data from devices travelling within a road network is already typically recorded in a data base of historic trace information 502. The data base of historic trace information 502 thus contains a number of traces, obtained from different devices, each trace comprising a sequence of location probe data samples describing a travelled path from a source to a destination. The location probes typically have a date and a time associated with each location. The historic data typically is made anonymous, so it cannot be traced back to a specific device or a specific user.

Figure 9:
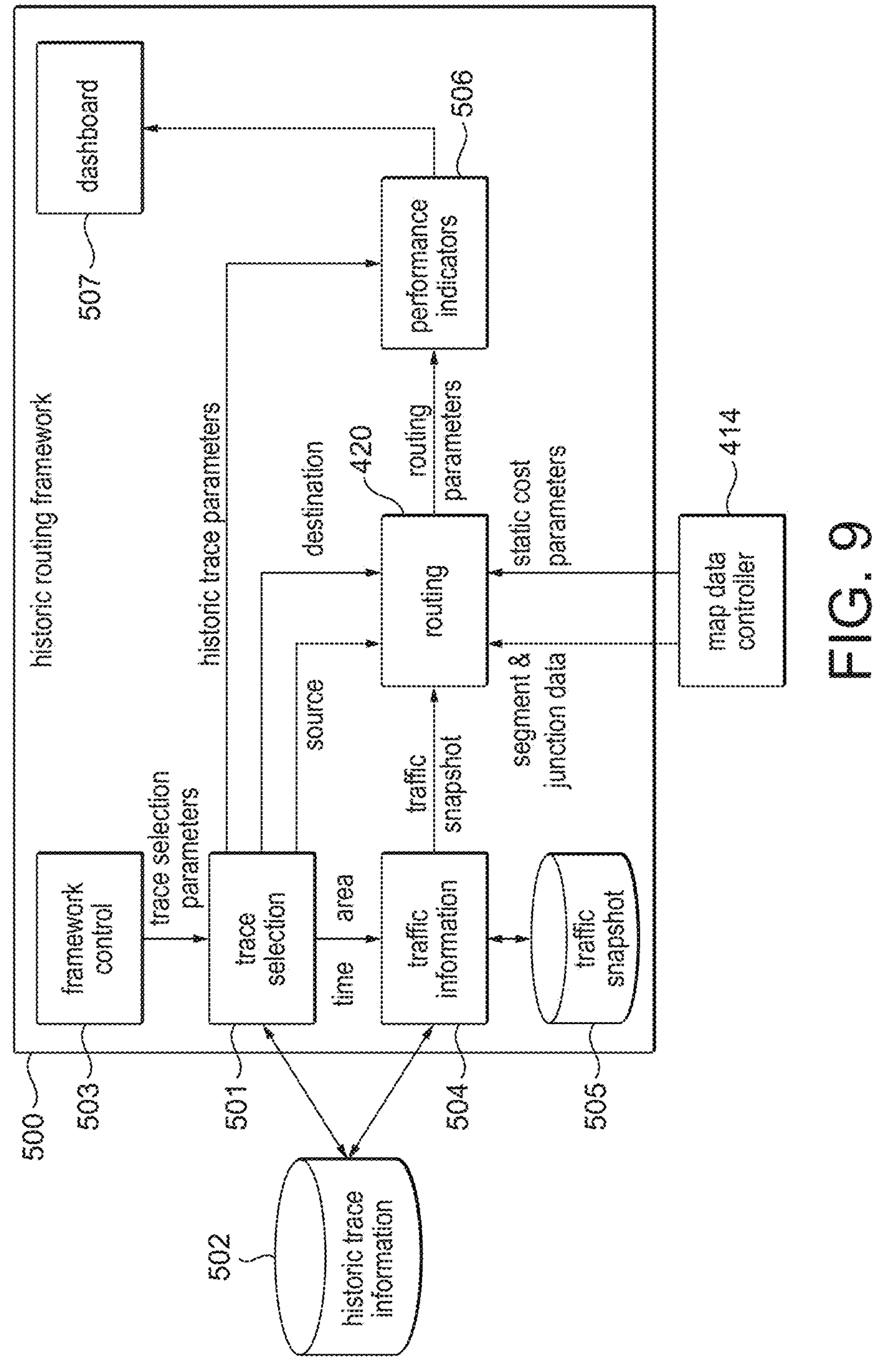
FIG. 9 illustrates a historic routing framework that can be used with embodiments of the present invention.

FIG. 9 contains a functional diagram for processing the historic trace information to generate the information that the navigation client operates on according to an embodiment of the present invention. FIG. 9 thus shows a historic routing framework 500 that obtains information from historic trace information and (historic) map information (from the map data controller module). The historic routing framework uses a number of components to process historic trace information for configuring a routing engine of a navigation client. The trace selection module 501 obtains trace selection parameters from a framework control module 503. The framework control module 503 typically interfaces with an operator of the framework for receiving input as to the trace selection parameters of interest. Typical selection parameters may include any of: time of day, day of the week, time period, a map area (city, state, country), trace length, trace duration, trace dominant functional road class, mode of transport (car, motorcycle, truck, etc.). The trace selection module 501 then obtains a trace from the historic trace information 502 that matches the trace selection parameters. Depending on the historic location data, the historic routing framework may process the location data. The trace location probes may not be suitable for use in the routing module. The historic routing framework may delete traces that cannot be matched to a SD map, that violate traffic rules (e.g. closed roads, one-way streets), or that perform impossible manoeuvres (navigating between unconnected roads). These steps generally involve matching the traces to a map as the map contains information about traffic speeds, traffic rules and navigation restrictions. The map matching for a trace involves finding the corresponding road segments in a map using the location probes in the trace. This map matching is a well-known technology used in navigation clients.

A traffic information module 504 of the historic routing framework 500 obtains the start time of the retrieved trace and the map area associated with the trace. It then retrieves location probes from the data base of historic trace information 502 covering a period up to the start time of the trace and with a location within the map area of the selected trace. The set of probes are then mapped to road segments in the map, e.g. finding the nearest road segment.

The set of probes for each road segment enable the traffic information module 504 to determine the historic speed of travel, the historic traffic volume and similar traffic parameters for each road segment in the map area, together forming a traffic snapshot 505 resembling the historic traffic information.

The traffic snapshot 505 for the map area and for the period prior to the start time of the trace is generated using the historic trace information 502 that has been recorded during the generation of "live" traffic information at the start time. Hence, the generated traffic snapshot 505 closely resembles the actual traffic information (historic traffic information) that would have been used at the start time (of the historic trace).

In a variant, several traffic snapshots are generated covering a sequence of time periods (e.g. each hour for a year of interest to the operator) for the map area (or for several map areas) and then placed in a traffic snapshot store. Instead of determining the traffic snapshot for the time (start time of the trace) and the map area (location), the traffic information module retrieves it from the traffic snapshot store. The store typically is implemented as a database. In a further variant, the store comprising historic traffic information (traffic snapshots) is generated on demand, when no historic traffic information is recorded in the store for a given period and location. These variants avoid repeated calculations of a traffic snapshot and replace it with retrieving it from the traffic snapshot store.

FIG. 9 also shows that the historic routing framework 500 contains a routing module 420 of a navigation client to be tested. The routing module 420 of the navigation client may be a software application, a software emulation of a PND, a test environment for the navigation client or a similar experimentation configuration for the navigation client or the routing module. The routing module may be a specific version of the routing module of the navigation client, e.g. a current version or an older/newer/experimental version.

The routing module 420 is configured with the start location, the destination location, the route travelled, the traffic snapshot, and the (historic) map information. This enable the routing module to determine the cost of the travelled route, the cost of the optimal route, and the various parameters associated with these routes (time of travel, traffic load, congestion delay, route attractiveness rating, route preference matching, etc.).

A performance indicator module obtains the parameters associated with the route and the actual parameters from the travelled route (the trace) and generates performance indicators for the generated parameters. It also may provide the performance indicators relative to the travelled route.

Figure 10:
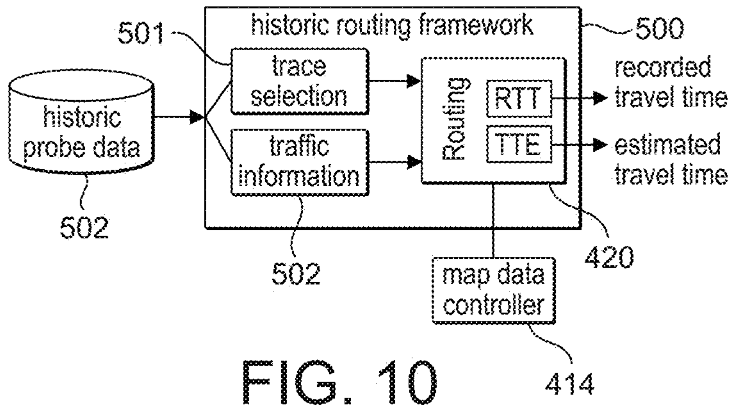
FIG. 10 further illustrates the use of the historic routing framework in FIG. 9 according to an embodiment.

Embodiments of the present invention relate in particular to the use of the historic routing framework 500 in order to generate estimated travel times for a route. FIG. 10 thus shows a historic routing framework module that obtains historic probe data from a data store of historic probe data 502, e.g. as describe above. The historic routing framework module selects a trace from the historic probe data and other traces in the same map area and during time window around the time of travel for the selected trace to generate traffic information which is then provided to the routing module 420. A recorded travel time (RTT) module of the routing module uses the departure location to obtain the departure time of the trace and the destination location to determine the arrival time for the selected trace. The RTT module uses the difference between the arrival time and the departure time to output the recorded travel time. An estimated travel time (ETT) module of the routing module processes the selected trace to determine a route associated with the location probes in the trace. The ETT module then uses the route and the traffic information to generate an estimated travel time for the route as output.

It will be appreciated that the travel time for a specific route will differ for each time it is travelled. These differences are caused primarily by fluctuations in traffic causing random delays in the travel time for the route. This is illustrated in FIG. 11.

Figure 11:
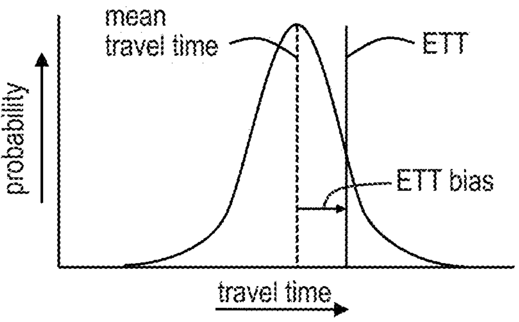
FIG. 11 illustrates a bias that may be associated with estimated travel times.

FIG. 11 thus shows the probability of observing a travel time for a specific route. The probability of the (recorded) travel time (RTT) has a distribution around a mean travel time. The travel time RTT typically has a normal distribution. The figure also shows an estimated travel time (ETT) that is different from the mean travel time. The difference is in effect representative a 'bias' (or error) for the estimated travel time of the ETT module. For the example of the figure, this means that the absolute ETT error $AE_n=ETT_n-RTT_n$ for a large number of trips (n=1 . . . N) has a shifted (normal) distribution. The shift is equal to the bias.

It is desirable that an estimator has zero or a very small bias. Hence, the ETT module needs to generate the estimated travel time (ETT) that is equal to the mean of the recorded travel time (RTT). This implies that the ETT error $E_n$ has a distribution that is centred around the generated ETT.

The historic routing framework provides a large number of traces for which RTT and ETT can be obtained. The recorded traces are different yet they will have sufficient similarity in terms of features (or they may be selected such that this is the case) to expect that the error distribution of the traces is centred around the ETT for these traces. In order to determine the error distribution for a large number of traces it is expressed relative to ETT. This means that the ETT error $E_n=(ETT_n-RTT_n)/ETT_n$ is normalised and can be expressed as a percentage. For a large number of traces, the mean of the distribution for $E_n$ should equal 0. In practice, there are a large number of factors that contribute to the estimated travel time for a route, so the $E_n$ may not be equal to 0 so the bias of an ETT estimator is bias(ETT)=mean ($\{E_n\}$). The historic routing framework thus provides a way to determine an ETT bias for an ETT module.

For instance, the historic probe data 502 contains traces from which a subset can be selected based on specific features such as:

- departure time (time, weekday, holiday)
- departure location (country, region, city)
- length category of the route (distance/time)
- overall traffic situation in the area of the route (e.g. traffic index)
- main Functional Road Class (FRC) for a route
- road conditions along a route
- number of turns
- number of traffic lights
- weather condition along the route Each feature has a range of (nominal, ordinal, or numerical) values. The combination of a collection of features is called a feature vector $FV=\{f_1, f_2, \ldots, f_k\}$ with K elements (specific features). The feature examples in the list above can be derived from typical information in a map. These features generally characterise a route.

Figure 12:
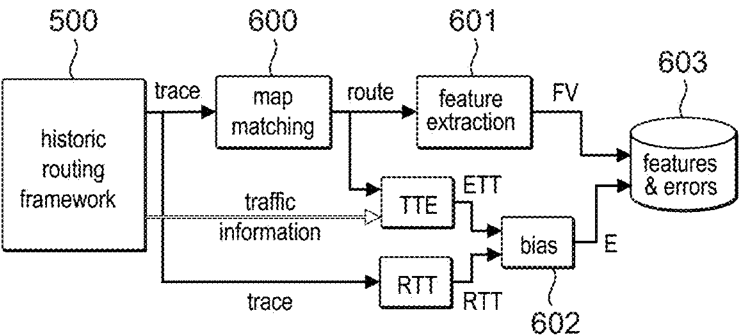
FIG. 12 shows how the historic routing framework can be used to generate a suitable set of features and errors for training a bias model.
Figure 12A:
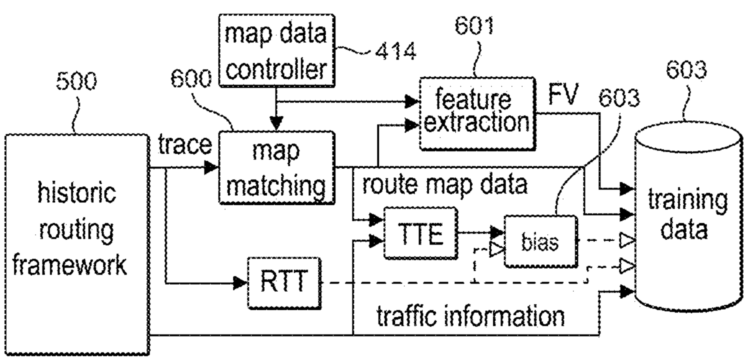
FIG. 12A shows another example of training data that can be generated using the historic routing framework.

FIG. 12 shows how the positional traces are processed in an embodiment to extract these features and the associated bias values. FIG. 12 thus shows a system diagram that obtains traffic information and traces from the historic routing framework 500 for further processing. The system contains a map matching module 600 that converts the obtained trace to a route containing a sequence of road segments of the map. The RTT module determines the recorded travel time (as described above). The system also contains the time estimation module (TTE) that calculates the estimated travel time (ETT) for the route associated with the trace under the traffic conditions described in the traffic information. The bias module 602 determines the ETT error (E). The figure also shows a feature extraction module 600 that receives the route associated with the trace and uses the road segments of the route and its attributes (from the map information) to determine a feature vector (FV) associated with the trace (route). FIG. 12A shows another example of how the positional traces may be processed in an embodiment to extract these features and the associated bias values. As shown in FIG. 12A it will be appreciated that the traffic information may also be, and preferably is, included into the training data. FIG. 12A also shows the inclusion of the recorded travel time as well as the bias value as model input data in the features and errors store 603. All of this information may thus be included into the set of training data 603 and used to generate a suitable multivariate bias model in an embodiment. The feature vector and the associated ETT error E is stored together as a single 'data set' for the trace in a features and errors storage 603. The features and errors storage 603 thus contains the feature vector and the ETT error associated with a trace in the historic probe data. This data is then to generate a model as shown in FIG. 13.

Figure 13:
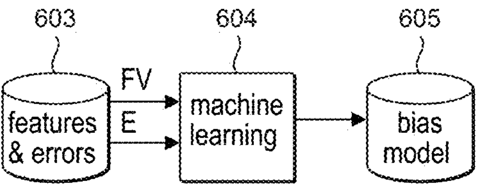
FIG. 13 illustrates the training of a bias model according to an embodiment.

FIG. 13 shows a machine learning module 604 that uses the feature vectors and the ETT errors to generate a bias model 605 that models how the feature elements contribute to the ETT error. For example, a suitable supervised machine learning system may be used for generating a bias model. The generation of the bias model also is called a learning phase of the machine learning system. In particular, the machine learning module 604 may execute and implement one or more machine learning algorithm that use the data sets from the features and errors storage 603 as a set of training data for generating the bias model 605.

Thus, the feature vectors represent a set of input parameters for the bias model 605, and the model is then trained using the desired bias values for those input parameters. In a variant implementation, the features and errors can be divided into subset in which substantially the same feature vectors are combined into a single feature vector and it is associated with the mean of the ETT errors in the subset. This reduces a subset of features and errors into a single feature vector and a mean ETT error value. The set of feature vectors and mean ETT errors then are used in the machine learning module as described above. This pre-processing step reduces the amount of data that the machine learning has to process improving processing speed without adversely impacting the accuracy of the generated bias model.

Adjustment of Estimated Travel Time

The bias model may be used in a navigation system for improving the estimated travel time. A system diagram for the estimated travel time adjustment is shown in FIG. 14.

Figure 14:
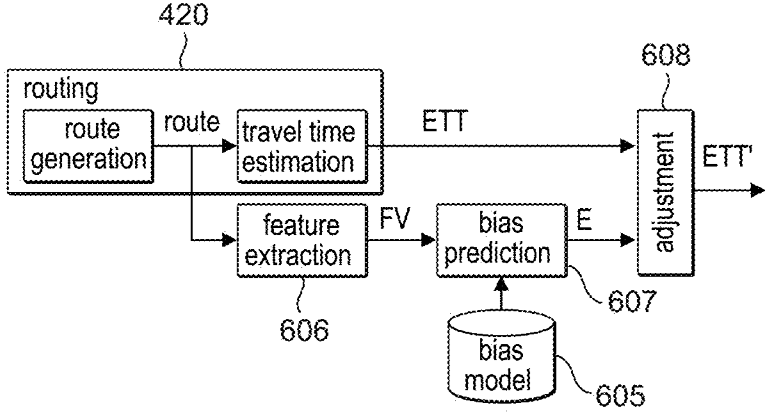
FIG. 14 shows how the trained bias model can be used to adjust estimated travel times according to an embodiment.

FIG. 14 shows a routing module 420 of a navigation client and an adjustment module 608 that modifies the estimated travel time obtained from the routing module using a predicted ETT error. The routing module 420 contains the travel time estimation module (TTE) for determining the estimated travel time (ETT) for the route. The system also contains a feature extraction module 606 that receives the route from the routing module 420 and extract the set feature values for the route forming the feature vector (FV). A bias prediction module 607 uses the bias model 605 to predict an ETT error (E) based on the received feature vector. An adjustment module 608 receives both the ETT and the predicted ETT error and generates an adjusted estimated travel time ETT'.

In a variant, the navigation system implements the route selection and the routing in a navigation server and sends the route and the estimated travel time to a navigation client. In this variant, the ETT adjustment is implemented in the navigation server that sends the adjusted ETT (ETT') to the navigation client.

The adjustment of the estimated travel time reduces the bias in the adjusted estimated travel time ETT' reported to the user. As the adjustment is independent from the travel time estimation module of the routing module, it provides a fast to deploy method to improve the accuracy of the travel time. As the adjustment is based on a large number of historic trip data and is entirely automated, it can provide an easy way to respond to changes in traffic patterns. It is also possible to detect when drastic changes have happened (because then the model behaves differently than expected and provides predictions that are not in line with recent observed travel times). If similar behaviour has been identified previously, learnings from the previous data can then be applied automatically to the currently changed situation. (On the other hand, if the behaviour is completely new, the system may need to wait for more data to be obtained so that a pattern emerges and the system automatically updates itself through its re-training on the new data).

Travel Time Estimation Based on an RTT Model

Figure 15:
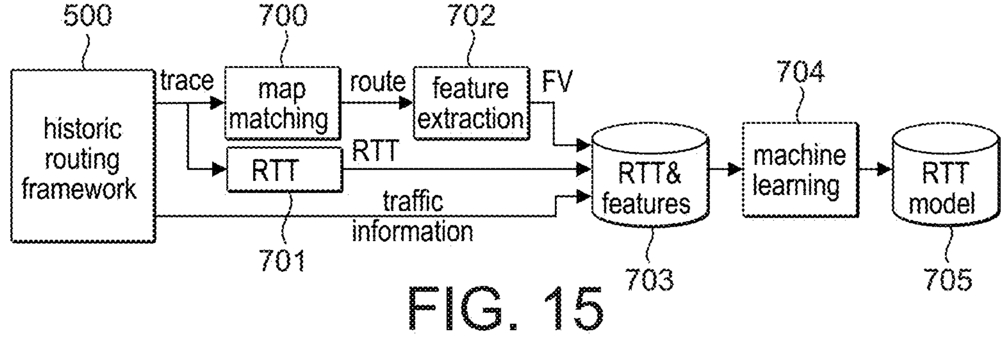
FIG. 15 illustrates the generation of a model for predicting estimated travel times according to an embodiment.

Another variant of the invention is to use the historic framework to generate the travel time estimation module as shown in FIG. 15.

FIG. 15 shows a system for generating a recorded travel time (RTT) model. The RTT model 705 is generated using a machine learning module that correlates features comprising a feature vector and traffic information with the recorded travel time (RTT). The feature extraction module 702 generates the feature vector associated with the route. The other modules in the figure (historic routing framework 500, map matching 700, RTT module 701) also are generally implemented as described above. A supervised machine learning system 704 may be used for generating the RTT model 705. The generation of the RTT model 705 also is called a learning phase of the machine learning system 704.

The RTT model 705 may be used in a navigation system for predicting the RTT for a route and associated traffic information. A system diagram for the routing module of a navigation system is shown in FIG. 16.

Figure 16:
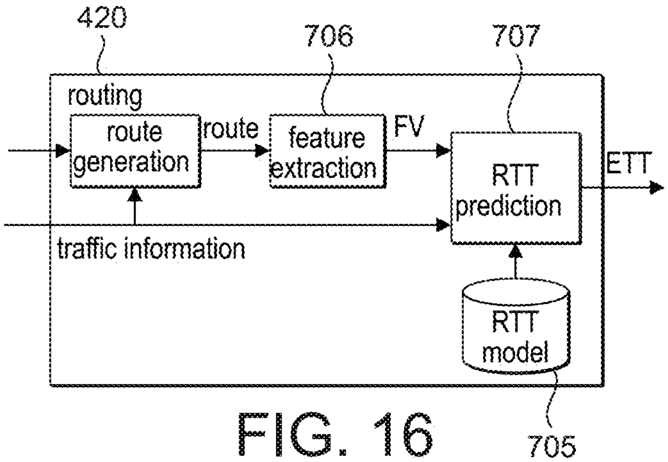
FIG. 16 illustrates the use of the model in FIG. 15 to determine estimated travel times.

FIG. 16 shows a routing module 420 of a navigation system. The routing module typically is implemented in the navigation client, but also can be present in a server-based module for navigation support. The routing module receives a starting location and a destination location and obtains the relevant traffic information to determine a route. A route generation module uses map information (see figure in background section), the traffic information and the user's route preferences to generate a route (possibly including further guidance from the user). The routing module contains a feature extraction module 706 that obtains the generated route and generates a feature vector FV as described above. FIG. 16 also shows an RTT prediction module 707 that uses the RTT model 705 (as described above) to predict an RTT for the obtained route and the obtained feature vector FV. The predicted RTT is equivalent to the estimated travel time as determined by a travel time estimation module.

The automated method for determining the estimated travel time shares the benefits of the adjustment method described earlier. It has the additional advantage that it replaces the traditional travel time estimation module with an automatically generated, more accurate method that is based on a large amount of historic travel information.

In the examples above a step of feature extraction is performed. However, it will be appreciated that this is not essential and that the machine learning may itself determine the features to be used when generating the model. This is illustrated in FIG. 17.

Figure 17:
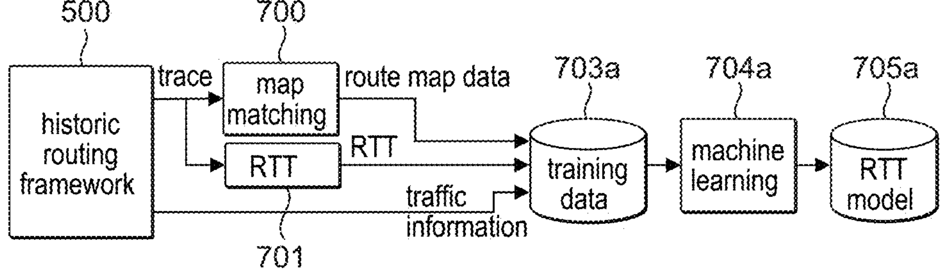
FIG. 17 illustrates another example of the generation of a model for predicting estimated travel times according to an embodiment.

FIG. 17 thus shows an example of a system for generating an RTT model. As shown, positional traces are obtained from the historic routing framework 500, in the same manner described above. The selected traces are then provided to a map matching module 700 that generates a set of map-matched route data, and to an RTT module 701 that determines the RTT for the trace. The route map data together with the RTT and the historic traffic data relevant for the trace are then included into a suitable set of training data 703*a* for the machine learning algorithm 704*a*. The machine learning algorithm 704*a* then trains the RTT model 705*a* based on the input training data 703*a* accordingly.

Figure 18:
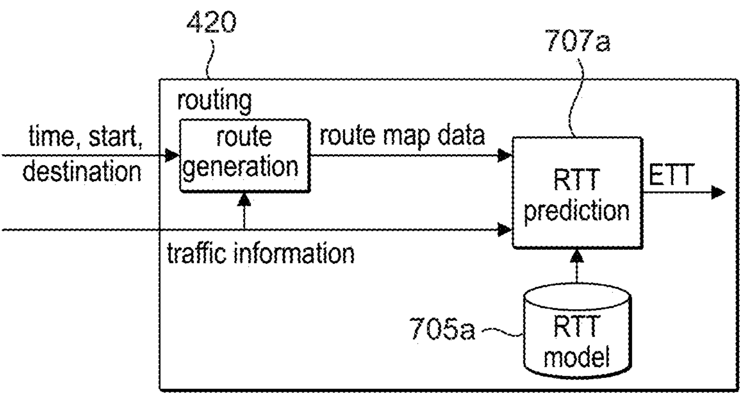
FIG. 18 illustrates the use of the model in FIG. 17 to determine estimated travel times.

The RTT model 705*a* generated in this way can then be used to predict an estimated travel time for a route in the manner shown in FIG. 18. Thus, a routing module 420 acts to generate a route, and then provides the route map data, along with the live traffic data, into an RTT prediction module 707*a* that uses the RTT model 705*a* to provide for output an estimated travel time.

Reporting Factors Contributing ETT Errors

The bias model (and the RTT model) may be used to provide insight into the features that are most relevant for an accurate travel time estimation. These models are derived from historic data which makes it difficult for human experts to understand the key factors that contribute to an accurate travel time estimation.

A feature importance step applies a feature importance analysis technique such as provided by the SciKit-learn or the SHAP (Shapley additive explanations) values from the SHAP Python library. The feature analysis gives information about which features play an important role in improving the performance of the model, and in what way they are contributing. For example, it may be the case that for predicting an ETT error, the weekend indicator plays an important role in the performance of the model. This information can be determined from the feature importance method from Scikit-learn, as well as from the SHAP values. The SHAP values will also additionally indicate whether this feature plays a negative or positive role on the ETT error rate (the ETT error increases or decreases for weekend trips compared to weekday trips).

A visualisation step uses the results of the feature importance step and displays them to users for example in a dashboard, or in a business intelligence report. This helps human decision making both for navigation purposes and for creating or adapting a road network infrastructure.

Model Updating

An advantage of the use of a machine learning model is that provides an automated way for improving the accuracy of the travel time estimation. Changes in the navigation system (e.g. map information updates) or in the traffic behaviour may result in reduced accuracy of the travel time information. This can be resolved by generating a new model and distributing the model to the navigation system components that use the model. As both the generation of the updated model and its distribution require substantial computing and communication resources, it is desirable to reduce the frequency of such updates.

The list below shows the main causes for reduced accuracy of model-based travel time estimation.

- Major events that change the driving behaviour (e.g. holidays, natural disasters, huge roadblocks, etc.). Such events may not be captured by the historical traces in the training set, so they are not part of the model.
- Changes to the navigation system such as traffic model, map information, speed profiles, or other navigation system updates. Under these conditions the trained model no longer may correspond to the changed navigation system.

In embodiments, a pattern-breaking detection step monitors the accuracy of the generated models. For instance, new positional traces may be recorded and obtained from the historic routing framework every day (or at any other suitable interval). These traces can then be used to evaluate the trained systematic ETT bias model. If one day the performance of the model gets worse than a threshold, a pattern-breaking event is considered to be happening. The feature importance of the model can also be analysed on the new traces and if the order of feature importance changes dramatically, a pattern-breaking event may also be considered happening. An interface may be provided for the developers to report new deployment of traffic model or speed profile.

A model update/re-train step uses the pattern breaking result to update or to completely re-train the model. If no pattern-breaking detected/reported, the model is automatically updated every day. This is done by adding the new traces into the set of training data, and then re-training the model based on the updated training data. The model can then be evaluated using the oldest traces in the training set. If the performance of the model for those traces drops beyond a threshold, this may be because the oldest traces are outdated (or the model doesn't have enough capacity to capture the oldest data) and these should be, and preferably are, removed from the training set. If new deployment of traffic model or speed profile is reported, the training set is automatically re-processed by the historical routing framework using the updated information, and the model is re-trained with the new training set. If pattern-breaking is automatically detected, after the routine model update, the updated model is then used to evaluate the new traces again. If pattern-breaking is still observed, alert emails may be sent out for human-involved investigation. The potential causes are: 1) un-reported modules change that affect ETT; 2) the model doesn't have the capability to capture the new pattern. If no pattern-breaking is observed, no further action is needed.

An ensure continuity step tracks the performance of the model. The continuity and reliability of the data insights uses a periodically re-trained model. The performance of the retrained model on a test set is compared against a performance threshold. Next to model performance, before adjusting the reported ETT according to the new insights, it is checked whether the proposed adjustment improves the ETT and on which trips it improves. Using a model in this way has been found to provide a significant reduction at least in the average absolute error (accumulated daily) for users of the navigable network. The model may also provide developers with automated recommendations for improving ETT accuracy, e.g. through suitable feature importance analysis, etc.

Figure 19:
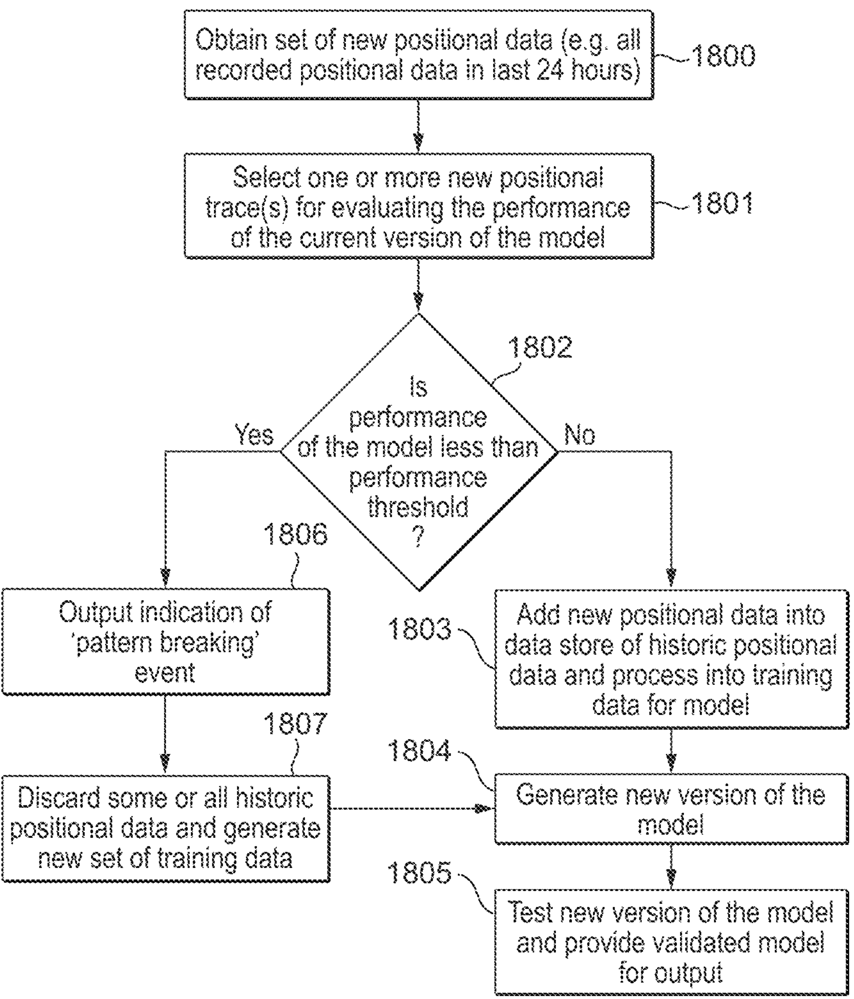
FIG. 19 illustrates a method of updating the model using newly obtained positional data.

FIG. 19 is a flow chart illustrating the updating of the model over time. At step 1800 a set of new positional data is obtained. This may correspond, e.g., to all of the recorded positional data within the last 24 hours. However, other arrangements would of course be possible, e.g. depending on the desired frequency for updating the model. When the set of new positional data is obtained, one or more positional trace(s) from the new positional data are then selected for testing the current performance of the model (step 1801). Preferably this is done using a plurality of positional traces to avoid an outlying trace distorting the method. In embodiments one or more historic traces can also be used for this testing, e.g. corresponding to routes that are known to be valid. It is then determined whether the performance of the model meets a performance threshold.

If the performance meets the threshold (step 1802—No) the new positional data is then added into the historic routing framework and processed into suitable training data (step 1803). A new version of the model is then generated (step 1804). Before the new version of the model is provided for output, it is then validated by testing its performance against the previous version of the model using a selected set of positional traces. The validated model can then be provided for output for use by a routing module of a navigation system (step 1805).

On the other hand, if the performance does not meet the threshold (step 1802—Yes), it is determined that a pattern-breaking event may have occurred, and this can be reported appropriately (e.g. as described above) (step 1806). In that event, some or all of the historic positional data may be discarded and a new set of training data generated using the new positional data (step 1807) which is then used to generate a new version of the model. As part of this, it is desirably also checked for any updates to the electronic map data or the routing module itself, such that the new set of training data can be processed using the updated information. If the new version of the model cannot be validated, this can be flagged up, e.g. by sending an alert e-mail, etc., in the manner described above. This may then trigger further investigation and/or updating of the underlying electronic map data, for instance.

Although primarily described in relation to navigation devices, it will be appreciated that route planning and navigation functionality may also be provided by a desktop or mobile computing resource running appropriate software. (For example, an on-line route planning and navigation facility is provided at mydrive.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.)

The techniques described herein may also be applied for evaluating the performance of the route planning algorithm in such off-line navigation systems. In general the present invention is applicable to any navigation system that may suitably be evaluated in the manner described herein.

The skilled person will appreciated that an apparatus provided to execute a method as described herein may comprise hardware, software, firmware or any combination of two or more of these.

The skilled person will appreciate that, whilst the term GPS data has been used to refer to positioning data derived from a GPS global positioning system. Other positioning data could be processed in a manner similar to the methods as described herein. Thus, term GPS data may be replaceable with the phrase positioning data.

All of the features disclosed in this specification, and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

The invention claimed is:

1. A method for updating a model to be used by a routing module of a navigation system to determine an estimated travel time for a route extending through a navigable network, the model having been trained using training data comprising a plurality of respective data sets derived from first positional traces stored within a data store of historic positional data, each of the first positional traces identifying a sequence of one or more navigable elements of the navigable network defining a respective route, and each data set in the set of training data comprising: a set of model input values characterizing one of the first positional traces and a corresponding model output value for the set of model input values, wherein the corresponding model output value is determined using a recorded travel time for the characterized first positional trace, and wherein the routing module determines an estimated travel time for a given route by:

obtaining a second positional trace identifying a second sequence of one or more navigable elements of the navigable network defining the given route;

inputting a second set of model input values determined from the second positional trace to the model to generate a corresponding second output value; and using the second output value generated by the model to determine the estimated travel time for the given route;

the method comprising:

obtaining a set of new positional data that has been obtained from devices travelling within an area of the navigable network, the set of new positional data including new positional traces, each new positional trace identifying a new sequence of one or more navigable elements of the navigable network defining a respective route from a start position to an end position, each new positional trace having an associated recorded travel time corresponding to the time taken to travel from the start position to the end position of the respective route;

selecting one or more of the new positional traces for evaluating a performance of the model;

for each of the selected one or more of the new positional traces, inputting a third set of model input values determined from the selected positional trace to the model to generate a corresponding third output value;

using the third output values generated by the model to determine third estimated travel times;

determining differences between the third estimated travel times and the recorded travel times for the selected one or more of the new positional traces;

determining whether the differences are greater than a threshold value;

if it is determined that the differences are greater than the threshold value:

discarding a plurality of the positional traces stored within the data store of historic positional data to result in a new set of positional traces stored within the data store;

selecting a second plurality of positional traces, the second plurality of positional traces including one or more of the new positional traces and one or more of the new set of positional traces stored within the data store;

for each of the second plurality of positional traces, determining a second set of training data, each second set of training data comprising: a second set of model input values characterizing a positional trace and a corresponding second model output value for the second set of model input values, wherein the corresponding second model output value is determined using a recorded travel time for the characterized positional trace; and generating a second version of the model using the second sets of training data; and if it is determined that the differences are not greater than the threshold value:

adding the new positional traces of the set of new positional data to the positional traces stored within the data store;

selecting a third plurality of positional traces, the third plurality of positional traces including one or more of the positional traces stored within the data store and one or more of the added new positional traces;

for each of the third plurality of positional traces, determining a third set of training data, each third set of training data comprising: a third set of model input values characterizing a positional trace and a corresponding third model output value for the third set of model input values, wherein the corresponding third model output value is determined using a recorded travel time for the characterized positional trace; and generating a third version of the model using the third sets of training data.

2. The method of claim 1, comprising, after generating the new second version of the model:

for each of the selected one or more of the new positional traces, inputting a third set of model input values determined from the selected positional trace to the second version of the model to generate a corresponding fourth output value;

using the fourth output values generated by the second version of the model to determine fourth estimated travel times;

determining second differences between the fourth estimated travel times and the recorded travel times for the selected one or more of the new positional traces;

comparing the second differences to the differences; and providing the second version of the model for use by the routing module of the navigation system only if it is determined that the second differences are less than the differences.

3. The method of claim 1, wherein the model is a bias model for adjusting estimated travel times determined by the routing module of a navigation system, whereby the routing module is operable to determine an estimated travel time for a given route by: determining an initial estimated travel time using a routing algorithm; and using a bias model output value of the bias model to adjust the initial estimated travel time determined by the routing module to provide an adjusted estimated travel time for the given route, the adjusted estimated travel time being provided for output; and wherein the bias model output value for a selected positional trace is a bias value indicative of a difference between the recorded travel time for the selected positional trace and an estimated travel time that has been determined for the selected positional trace by the route planning module of the navigation system using the historic traffic data for the selected positional trace.

4. The method of claim 1, wherein the routing module when determining an estimated travel time is further configured to obtain traffic data indicative of traffic conditions within the navigable network, and to process using the model a set of model input values determined from both a set of route data for the route and the historic traffic data to generate the corresponding output value; and further comprising adding one or more positional traces from the set of new positional data into the data store of historic positional data, and using the data in the data store of historic positional data including the new positional traces to provide a set of training data for training one or more machine learning algorithms for generating the model, comprises generating data sets comprising a set of model input values characterizing both the selected positional trace and the traffic conditions in the area of the navigable network during a time period associated with the selected positional trace, together with the corresponding output value.

5. The method of claim 4, wherein the training data is generated using positional data from the data store of historic positional data by:

selecting a positional trace from the data store of historic positional data that has been obtained from devices travelling within an area of the navigable network, the selected positional trace comprising a sequence of positional data corresponding to the movement of a device along a respective path extending through the area of the navigable network from a start position to an end position in the area of the navigable network;

obtaining a recorded travel time for the selected positional trace, the recorded travel time corresponding to the time taken for the device to travel from the start position to the end position along the respective path for the selected positional trace;

obtaining a set of historic traffic data indicative of traffic conditions in the area of the navigable network during a time period associated with the selected positional trace;

generating from the selected positional trace a respective data set for inclusion into a set of training data for generating the model, each data set comprising:

a set of model input values characterizing the selected positional trace and the traffic conditions in the area of the navigable network during the time period associated with the selected positional trace; and a corresponding model output value for the set of model input values, wherein the model output value is determined using the recorded travel time for the selected positional trace; and including the respective data set generated from the selected positional trace into a set of training data for generating the model, the set of training data comprising a plurality of such data sets each including a respective set of model input values and a corresponding model output value.

6. The method of claim 5, wherein the step of obtaining the set of historic traffic data indicative of traffic conditions in the area of the navigable network during the time period associated with the selected positional trace comprises: obtaining positional data in the area of the navigable network during the time period associated with the selected positional trace; and generating the set of historic traffic data using the obtained positional data.

7. The method of claim 5, comprising processing the selected positional trace to determine the set of model input values by matching the selected positional trace onto a respective set of nodes and segments of the navigable network, and obtaining the set of model input values from the data and the traffic data associated with those nodes and segments.

8. The method of claim 5, comprising processing the selected positional trace to determine the set of model input values by extracting a set of characteristic feature values for the selected positional trace, and using the set of characteristic feature values as the set of model input values, wherein the set of characteristic feature values includes one or more of: (i) a data value indicative of the time period; (ii) a data value indicative of a location associated with the selected positional trace; (iii) a length of the respective path for the selected positional trace; (iv) a class or condition associated with the navigable elements along the path associated with the selected positional trace; (v) a number of turns along the path associated with the selected positional trace; (vi) a number of junctions along the path associated with the selected positional trace; and (vii) a number of traffic lights along the path associated with the selected positional trace.

9. The method of claim 1, wherein the set of new positional data that is obtained corresponds to all of the recorded positional data in an area of the navigable network within a certain time interval.

10. The method of claim 1, being performed at a server, the method further comprising distributing the model to one or more navigation devices.

11. The method of claim 1, being performed at a server in communication with a plurality of navigation devices, wherein the server comprises the routing module that is operable to generate routes and to determine associated estimated travel times for the routes, and wherein the navigation devices are operable to issue requests to the routing module of the server for routes and associated estimated travel times.

12. A method for determining an estimated travel time for a route extending through a navigable network, the method comprising:

obtaining a set of route data for the route, the route data identifying a sequence of one or more navigable elements of the navigable network defining the route;

obtaining traffic data indicative of traffic conditions in the navigable network;

inputting a set of model input values determined from the set of route data for the route and the obtained traffic data to a model that has been trained to generate from the set of model input values a corresponding output value useable in determining an estimated travel time for the route, the model having been trained using training data comprising a plurality of respective data sets derived from first positional traces stored within a data store of historic positional data, each of the first positional traces identifying a sequence of one or more navigable elements of the navigable network defining a respective route, and each data set in the set of training data comprising: a set of model input values characterizing one of the first positional traces and a corresponding model output value for the set of model input values, wherein the corresponding model output value is determined using a recorded travel time for the characterized first positional trace; and determining using the output value produced by the model for the route an estimated travel time for the route;

obtaining a set of new positional data that has been obtained from devices travelling within an area of the navigable network, the set of new positional data including one or more new positional traces, each new positional trace identifying a new sequence of one or more navigable elements of the navigable network defining a respective route from a start position to an end position, each new positional trace having an associated recorded travel time corresponding to the time taken to travel from the start position to the end position of the selected positional trace;

selecting one or more of the new positional traces for evaluating a performance of the model;

for each of the selected one or more of the new positional traces, inputting a second set of model input values determined from the selected new positional trace to the model to generate a corresponding second output value;

using second third output values generated by the model to determine second estimated travel times;

determining differences between the second estimated travel times determined for the selected one or more of the new positional traces and the recorded travel times for the selected one or more of the new positional traces;

determining whether the differences are greater than a threshold value; and if it is determined that the differences are greater than the threshold value:

discarding a plurality of the positional data in the data store of historic positional data to result in a new set of positional traces stored within the data store;

selecting a second plurality of positional traces, the second plurality of positional traces including one or more of the new positional traces and one or more of the new set of positional traces stored within the data store;

for each of the second plurality of positional traces, determining a second set of training data, each second set of training data comprising: a second set of model input values characterizing a positional trace and a corresponding second model output value for the second set of model input values, wherein the corresponding second model output value is determined using a recorded travel time for the characterized positional trace; and generating a second version of the model using the second sets of training data; and if it is determined that the differences are not greater than the threshold value:

adding the new positional traces of the set of new positional data to the positional traces stored within the data store;

selecting a third plurality of positional traces, the third plurality of positional traces including one or more of the positional traces stored within the data store and one or more of the added new positional traces;

for each of the third plurality of positional traces, determining a third set of training data, each third set of training data comprising: a third set of model input values characterizing a positional trace and a corresponding third model output value for the third set of model input values, wherein the corresponding third model output value is determined using a recorded travel time for the characterized positional trace; and generating a third version of the model using the third sets of training data.

13. The method of claim 12, wherein the method is performed by a navigation system including the routing module, and wherein the output value produced by the model is a bias value for adjusting an initial estimated travel time previously determined by the routing module of the navigation system, the step of determining using the output value produced by the model for the route an estimated travel time for the route comprising:

adjusting the initial estimated travel time for the route determined by the routing module of the navigation system using the output value produced by the model for the route to determine an adjusted estimated travel time for the route; and providing the adjusted estimated travel time for output.

14. The method of claim 12, wherein the set of model input values include a data value indicative of a time period associated with the route, a data value indicative of a location associated with the route, as well as one or more "route feature" values characterizing the route in terms of one or more of: (i) a length of the route; (ii) a dominant class or condition of navigable element associated with the navigable elements along the route; (iii) a total number of turns along the route; (iv) a total number of junctions along the route; or (v) a total number of traffic lights along the route.

15. The method of claim 12, wherein the method is performed by a navigation client, the method further comprising providing the determined estimated travel time for output to a user of a navigation system executing the navigation client.

16. The method of claim 1, comprising obtaining historic weather data indicative of weather conditions in the area of the navigable network during the time period associated with the selected positional trace, and generating from the historic weather data a model input value for the set of model of input values in the data set generated for the selected positional trace that is indicative of the weather conditions in the navigable network for the time period.

17. A non-transitory computer-readable storage medium storing instructions that, when executed by a data processor, cause the data processor to perform operations comprising:

obtaining a set of route data for a route, the route data identifying a sequence of one or more navigable elements of a navigable network defining the route;

obtaining traffic data indicative of traffic conditions in the navigable network;

inputting a set of model input values determined from the set of route data for the route and the obtained traffic data to a model that has been trained to generate from the set of model input values a corresponding output value useable in determining an estimated travel time for the route, the model having been trained using training data comprising a plurality of respective data sets derived from first positional traces stored within a data store of historic positional data, each of the first positional traces identifying a sequence of one or more navigable elements of the navigable network defining a respective route, and each data set in the set of training data comprising: a set of model input values characterizing one of the first positional traces and a corresponding model output value for the set of model input values, wherein the corresponding model output value is determined using a recorded travel time for the characterized first positional trace;

determining using the output value produced by the model for the route an estimated travel time for the route;

obtaining a set of new positional data that has been obtained from devices travelling within an area of the navigable network, the set of new positional data including one or more new positional traces, each new positional trace identifying a new sequence of one or more navigable elements of the navigable network defining a respective route from a start position to an end position, each new positional trace having an associated recorded travel time corresponding to the time taken to travel from the start position to the end position of the selected positional trace;

selecting one or more of the new positional traces for evaluating a performance of the model;

for each of the selected one or more of the new positional traces, inputting a second set of model input values determined from the selected new positional trace to the model to generate a corresponding second output value;

using second third output values generated by the model to determine second estimated travel times;

determining differences between the second estimated travel times determined for the selected one or more of the new positional traces and the recorded travel times for the selected one or more of the new positional traces;

determining whether the differences are greater than a threshold value; and if it is determined that the differences are greater than the threshold value:

discarding a plurality of the positional data in the data store of historic positional data to result in a new set of positional traces stored within the data store;

selecting a second plurality of positional traces, the second plurality of positional traces including one or more of the new positional traces and one or more of the new set of positional traces stored within the data store;

for each of the second plurality of positional traces, determining a second set of training data, each second set of training data comprising: a second set of model input values characterizing a positional trace and a corresponding second model output value for the second set of model input values, wherein the corresponding second model output value is determined using a recorded travel time for the characterized positional trace; and generating a second version of the model using the second sets of training data; and if it is determined that the differences are not greater than the threshold value:

adding the new positional traces of the set of new positional data to the positional traces stored within the data store;

selecting a third plurality of positional traces, the third plurality of positional traces including one or more of the positional traces stored within the data store and one or more of the added new positional traces;

for each of the third plurality of positional traces, determining a third set of training data, each third set of training data comprising: a third set of model input values characterizing a positional trace and a corresponding third model output value for the third set of model input values, wherein the corresponding third model output value is determined using a recorded travel time for the characterized positional trace; and generating a third version of the model using the third sets of training data.

18. The method of claim 11, comprising obtaining weather data indicative of weather conditions in the navigable network, and providing a model input value determined from the obtained weather data to the model as part of the set of model of input values for the route for use in generating the output value.

* * * * *